US012523452B2

(12) United States Patent
Nash et al.

(10) Patent No.: US 12,523,452 B2
(45) Date of Patent: Jan. 13, 2026

(54) COMPACT SELF-DEFENSE DEVICES AND ALERT SYSTEMS

(71) Applicant: Triple4s Holding, LLC, East Lansing, MI (US)

(72) Inventors: Logan Malone Nash, East Lansing, MI (US); Matthew Robert Rogien, East Lansing, MI (US)

(73) Assignee: Triple4s Holdings, LLC, South Haven, MI (US)

( * ) Notice: Subject to any disclaimer, the term of this patent is extended or adjusted under 35 U.S.C. 154(b) by 62 days.

(21) Appl. No.: 18/404,636

(22) Filed: Jan. 4, 2024

(65) Prior Publication Data

US 2024/0230282 A1 Jul. 11, 2024

Related U.S. Application Data

(60) Provisional application No. 63/470,636, filed on Jun. 2, 2023, provisional application No. 63/437,349, filed on Jan. 5, 2023.

(51) Int. Cl.

| | |
|---|---|
| ***F41H 9/10*** | (2006.01) |
| ***G08B 21/02*** | (2006.01) |
| ***G08B 25/00*** | (2006.01) |

(52) U.S. Cl.

CPC ............... *F41H 9/10* (2013.01); *G08B 21/02* (2013.01); *G08B 25/003* (2013.01)

(58) Field of Classification Search

CPC .... G08B 15/004; G08B 25/016; G08B 25/12; G08B 21/02; F41H 9/10; B05B 12/085; B05B 7/2408

See application file for complete search history.

(56) References Cited

U.S. PATENT DOCUMENTS

| | | | |
|---|---|---|---|
| 8,525,880 | B2 | 9/2013 | Dipoala |
| 9,002,317 | B2 | 4/2015 | Hymowitz |
| 9,386,438 | B2 | 7/2016 | Hymowitz |
| 9,485,477 | B2 | 11/2016 | Dipoala |
| 9,578,291 | B2 | 2/2017 | Dipoala |
| 9,691,244 | B2 | 6/2017 | Weng |

(Continued)

FOREIGN PATENT DOCUMENTS

| | | | |
|---|---|---|---|
| WO | 2022097224 | A1 | 5/2022 |
| WO | 2023099965 | A1 | 6/2023 |

*Primary Examiner* — Mirza F Alam

(74) *Attorney, Agent, or Firm* — Neal, Gerber & Eisenberg LLP

(57) ABSTRACT

Compact self-defense devices and alert systems are disclosed. An example compact self-defense device includes a housing defining a chamber configured to house a cartridge of an inflammatory agent. The compact self-defense device includes a spray nozzle including a button and at least partially housed in the housing. The spray nozzle is configured to receive the cartridge in the housing. The spray nozzle is configured to spray the inflammatory agent when the button is engaged. The compact self-defense device includes a sensor housed in the chamber and configured to detect when the spray nozzle is spraying the inflammatory agent. The compact self-defense device includes a communication module housed in the chamber and configured to transmit a signal for alerting one or more preselected emergency contacts in response to the sensor detecting that the spray nozzle is spraying the inflammatory agent.

20 Claims, 21 Drawing Sheets

(56) References Cited

U.S. PATENT DOCUMENTS

| | | | | |
|---|---|---|---|---|
| 9,779,598 | B2 | 10/2017 | Dipoala | |
| 10,520,282 | B2 | 12/2019 | Nangunoori | |
| 11,152,802 | B1 | 10/2021 | Small | |
| 11,287,225 | B2 | 3/2022 | Bogacz et al. | |
| 11,402,179 | B2 | 8/2022 | Nance et al. | |
| 11,413,478 | B2 | 8/2022 | Bina et al. | |
| 11,478,229 | B1 | 10/2022 | Casali | |
| 11,644,284 | B2 | 5/2023 | Bogacz et al. | |
| 2015/0069082 | A1* | 3/2015 | Breeden | F41H 9/10<br>222/402.1 |
| 2015/0133072 | A1* | 5/2015 | Jang | G08B 15/02<br>455/418 |
| 2017/0039831 | A1* | 2/2017 | Weng | G08B 15/004 |
| 2022/0051550 | A1* | 2/2022 | Gavshon | G08B 15/004 |
| 2022/0379450 | A1 | 12/2022 | Ingianni | |
| 2022/0383718 | A1 | 12/2022 | Langner et al. | |
| 2023/0037946 | A1 | 2/2023 | Bina et al. | |
| 2023/0071867 | A1* | 3/2023 | Ramanathan | F41A 17/063 |
| 2023/0312222 | A1 | 10/2023 | Medved et al. | |

* cited by examiner

COMPACT SELF-DEFENSE DEVICES AND ALERT SYSTEMS

REFERENCE TO RELATED APPLICATIONS

This application claims the benefit of U.S. Provisional Patent Application Ser. No. 63/437,349, filed on Jan. 5, 2023, and U.S. Provisional Patent Application Ser. No. 63/470,636, filed on Jun. 2, 2023; both of which are incorporated by reference in their entirety.

TECHNICAL FIELD

The present disclosure generally relates to self-defense devices and, more specifically, to compact self-defense devices and alert systems.

BACKGROUND

Self-defense devices assist individuals to maintain personal safety when other resources may not be immediately available. One type of self-defense device is commonly known as a pepper spray device. A pepper spray device offers protection at a distance by propelling a liquid (such as made of oleoresin capsicum (OC) spray, capsaicin spray, or capsicum spray), which is an inflammatory agent that can irritate the eye with a burning sensation, pain, and/or temporary blindness. Such devices include a canister for holding the liquid and enable a person to spray the inflammatory agent from the canister in a direction of the eyes of an assailant.

Many pepper spray devices are difficult to use. Additionally, may pepper spray devices are so bulky that users tend to store them in large bags when they are out in public. As a result, a user of such pepper spray devices may be unable to access and operate the device quickly enough to deter an attack from an assailant.

Moreover, a person may remain in a dangerous situation even after successfully using a pepper spray device to deter an attack from an assailant. For instance, a person may be unable to safely flee from the assailant after using the pepper spray device. A person may want to contact someone for assistance. However, if the assailant remains nearby, that person may be unable to quickly and conspicuously call for assistance.

SUMMARY

The appended claims define this application. The present document discloses aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for compact self-defense devices and alert systems. An example disclosed compact self-defense device includes a housing defining a chamber configured to house a cartridge of an inflammatory agent. The compact self-defense device includes a spray nozzle including a button and at least partially housed in the housing. The spray nozzle is configured to receive the cartridge in the housing. The spray nozzle is configured to spray the inflammatory agent when the button is engaged. The compact self-defense device includes a sensor housed in the chamber and configured to detect when the spray nozzle is spraying the inflammatory agent. The compact self-defense device includes a communication module housed in the chamber and configured to transmit a signal for alerting one or more preselected emergency contacts in response to the sensor detecting that the spray nozzle is spraying the inflammatory agent.

An example disclosed self-defense system includes a self-defense device and a remote server. The self-defense device includes a spray nozzle including a button and configured to receive a cartridge of an inflammatory agent. The spray nozzle is configured to spray the inflammatory agent when the button is engaged. The self-defense device includes a sensor configured to detect when the spray nozzle is spraying the inflammatory agent. The self-defense device includes a communication module configured to transmit a signal to a mobile device in response to the sensor detecting that the spray nozzle is spraying the inflammatory agent. The remote server is configured to receive the signal of the self-defense system via the mobile device and transmit an alert to one or more preselected emergency contacts in response to receiving the signal.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION

Figure 1:
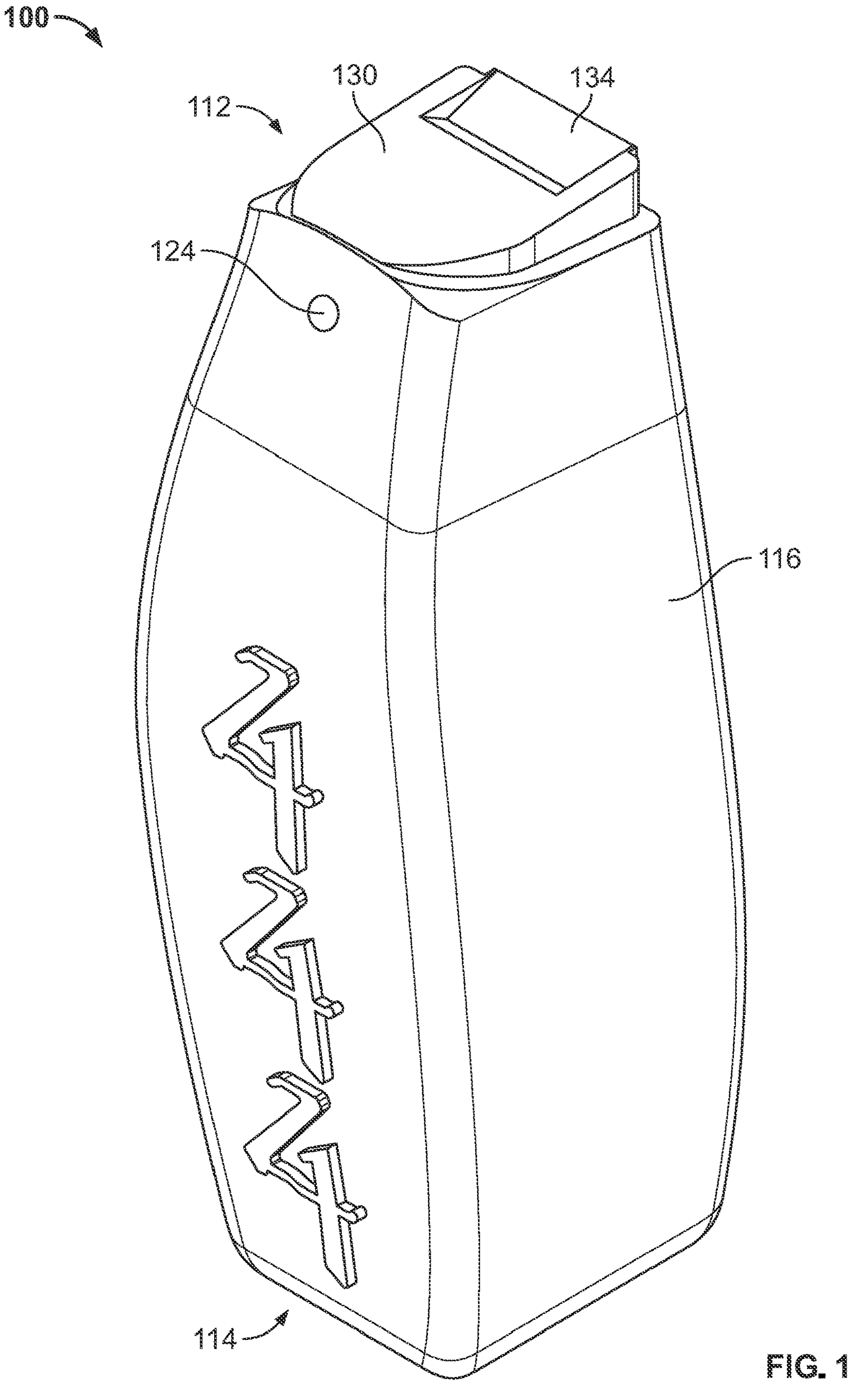
FIG. 1 illustrates an example self-defense device in accordance with the teachings herein.
Figure 2:
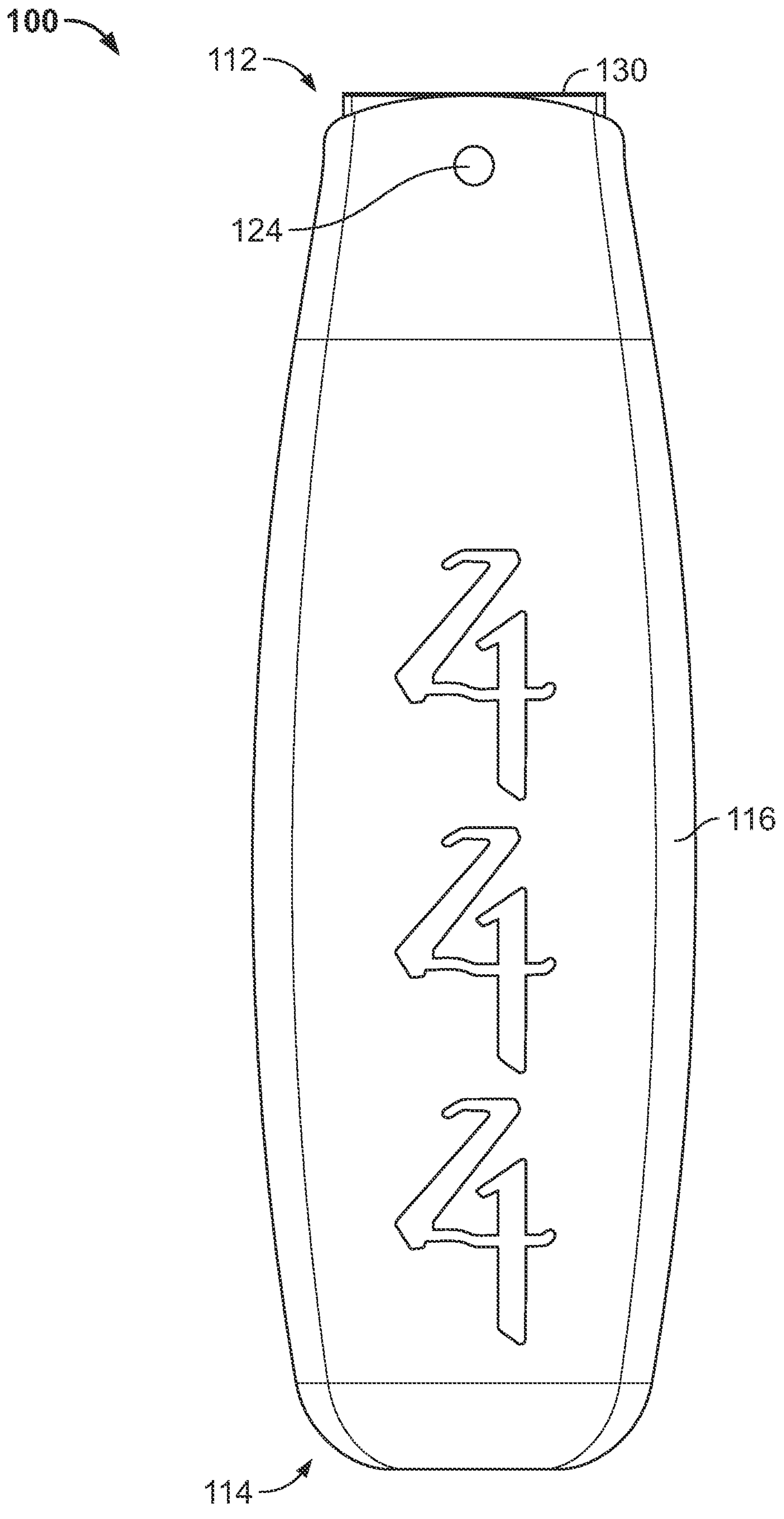
FIG. 2 is a front view of the self-defense device of FIG. 1.
Figure 3:
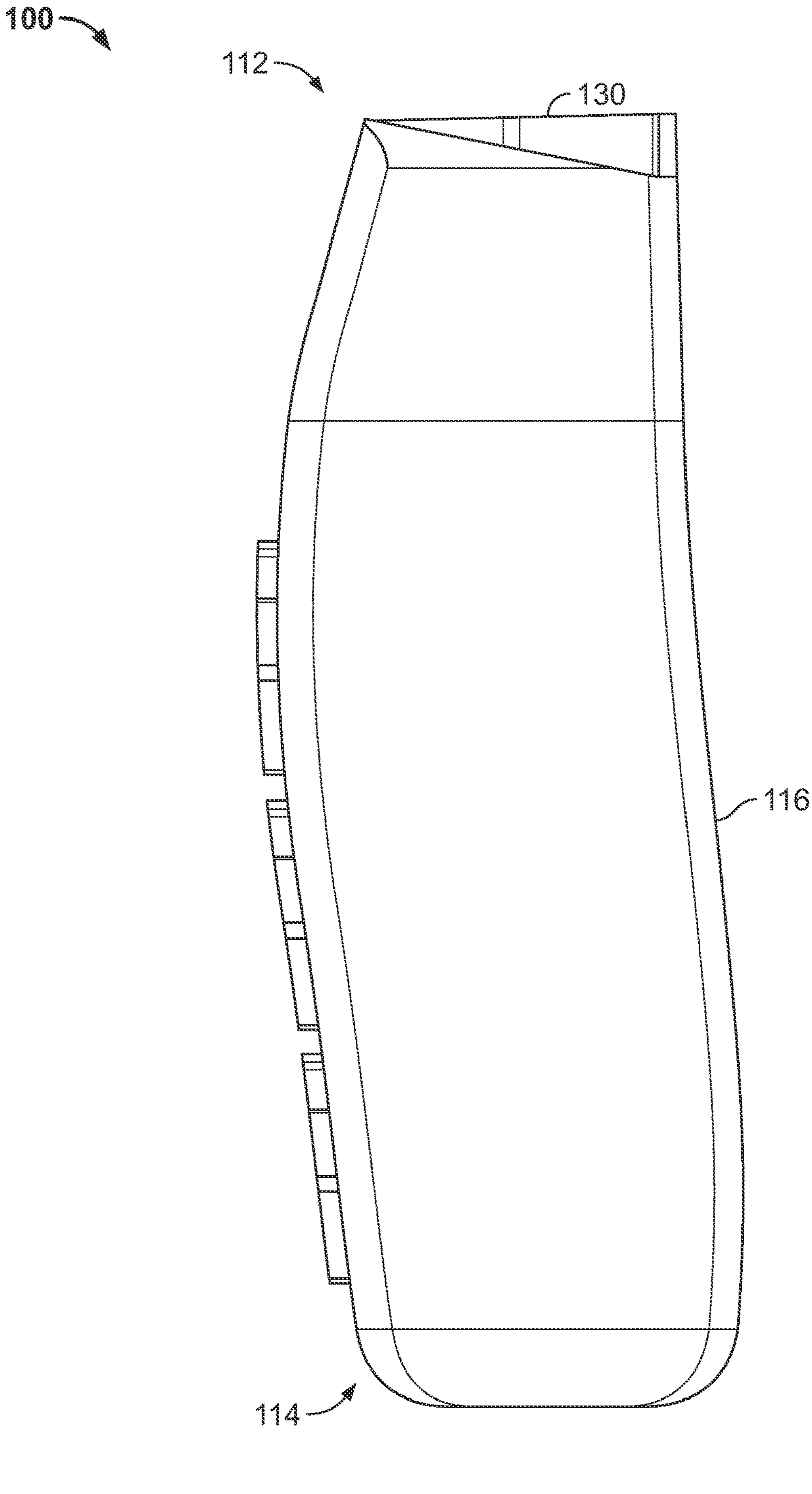
FIG. 3 is a side view of the self-defense device of FIG. 1.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Example devices disclosed herein include convenient, non-lethal self-defense device that offers protection at a distance by propelling an inflammatory agent at a distance. Once activated, the device is further capable of transmitting the user's current location and a pre-written message to one or more recipients. In certain embodiments, the transmission occurs via an app installed on the user's mobile phone. The user can modify the app to select contacts of their choosing. In certain embodiments, the device includes a 360-degree rotating clip, which may be utilized to affix the device to the user or to any other suitable material. This clip might also be used a glass breaker. On the inside of the device sits a printed circuit board, which is powered by a battery and sends out a signal to the user's mobile phone via Bluetooth® connectivity. The self-defense device may further include some sort of identification substance such as an ultra-violet dye or glitter. The outside of the device may be formed of carbon fiber, aluminum, and/or other material.

For example, self-defense devices disclosed herein are compact to enable a user to easily carry and quickly access and operate the device when needed. Each self-defense device includes a spray nozzle and a button. The spray nozzle is configured to emit pepper spray and/or another inflammatory agent when the button is pressed. The self-defense device includes a housing for a cartridge of the inflammatory agent. The self-defense device is sized and shaped to house a standard-sized cartridge (e.g., a ¼-ounce cartridge) in a sleek and compact manner.

The self-defense devices disclosed herein also include a communication module (e.g., a Bluetooth® device) and a sensor (e.g., a pressure sensor). When the sensor detects that the button has been engaged, the communication module sends a signal, which results in one or more preselected emergency contacts receiving an alert that the user has activated their device.

In some examples, the self-defense device includes a door (e.g., a hinged door) that provides access to the cartridge housed in the housing of the device. The door enables a user to access and replace an empty cartridge with a full replacement cartridge. In some examples, a self-defense device includes a clip (e.g., a rotatable clip) that enables the user to fasten the device to a surface (e.g., a waistband). Additionally or alternatively, the self-defense device may include a magnet that is configured to facilitate a magnetic coupling to a mobile device (e.g., a mobile phone, a smartwatch, etc.) of the user. In some examples, the self-defense device includes a glass breaker, which is a tool configured to break through tempered glass and/or other surface(s). In some examples, the self-defense device includes one or more lights (e.g., light-emitting diodes (LEDs)) to facilitate identifying a location and/or orientation of the device prior, during, and/or upon use. In some examples, the self-defense device includes one or more rechargeable batteries to operate the electronic components of the device. For example, the self-defense device may include a charging port (e.g., a USB port such as a USB-C port) to recharge the one or more batteries.

Alert systems disclosed herein enable the self-defense device to communicate, directly and/or indirectly, with (1) another device of the user and/or (2) device(s) of preselected emergency contact(s) of the user (e.g., friends, family, partner, security company, etc.). For example, when the user uses the spray nozzle of the self-defense device, its communication module sends a signal.

In some examples, the self-defense device sends a signal to a mobile device of the user, for example, via a wireless personal area network (WPAN) connection, such as Bluetooth®. For example, the self-defense device is paired with the mobile device of the user. Upon receiving the signal from the self-defense device, the mobile device sends a signal to directly to the preselected emergency contact(s) and/or to a remote server, for example, via a cellular communication. The remote server may then transmit an alert to the preselected emergency contact(s). In some examples, the signal is sent directly from the self-defense device to the emergency contacts and/or the remote server.

In some examples, the remote server collects other information from the self-defense device and/or the mobile device. For example, the remote server may collect a geolocation of the user when the self-defense device has been activated. The remote server may also collect a description or incident report provided by the user via the mobile device. In some such examples, an artificial intelligence (AI) language model may be implemented to facilitate the user in quickly generating the incident report. The remote server may use the geolocation and description data to identify trends in reported incidences.

Turning to the figures, FIGS. 1-7 depict an example self-defense device 100 in accordance with the teachings herein. In the illustrated example, the self-defense device 100 (also referred to as "the device") is a pepper spray device. The device 100 includes a housing 110 with an upper end 112 and a lower end 114. The housing 110 includes one or more side walls 116 that extend between the upper end 112 and the lower end 114. As most clearly shown in FIGS. 1-2, a logo and/or other design may be placed on one or more of the side wall(s) 116.

Figure 4:
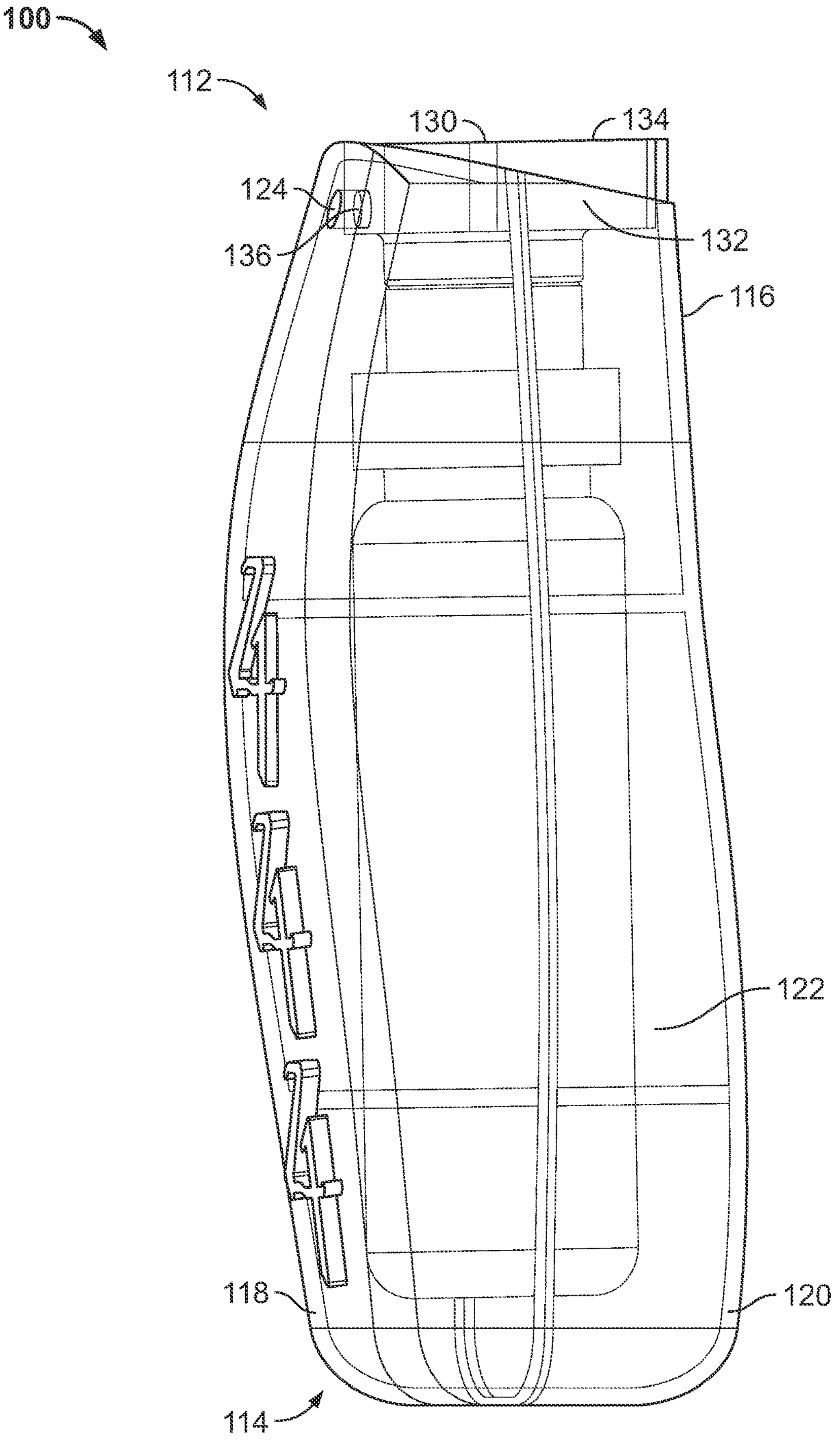
FIG. 4 is another side view of the self-defense device of FIG. 1 with a housing of the self-defense device being depicted as translucent.

The housing 110 is formed from one or more shell bodies. As shown in FIG. 4, the housing 110 of the illustrated example is formed from a shell body 118 (also referred to as a "first shell body" or a "first shell") and another shell body 120 (also referred to as a "second shell body" or a "second shell"). The shell body 118 and the shell body 120 are coupled together (e.g., via press fit, fasteners, adhesive, clamping, etc.) to form the housing 110. The shell bodies 118, 120 and/or the housing 110 may be formed of carbon fiber, aluminum, and/or other sturdy and aesthetically pleasing material.

Figure 8:
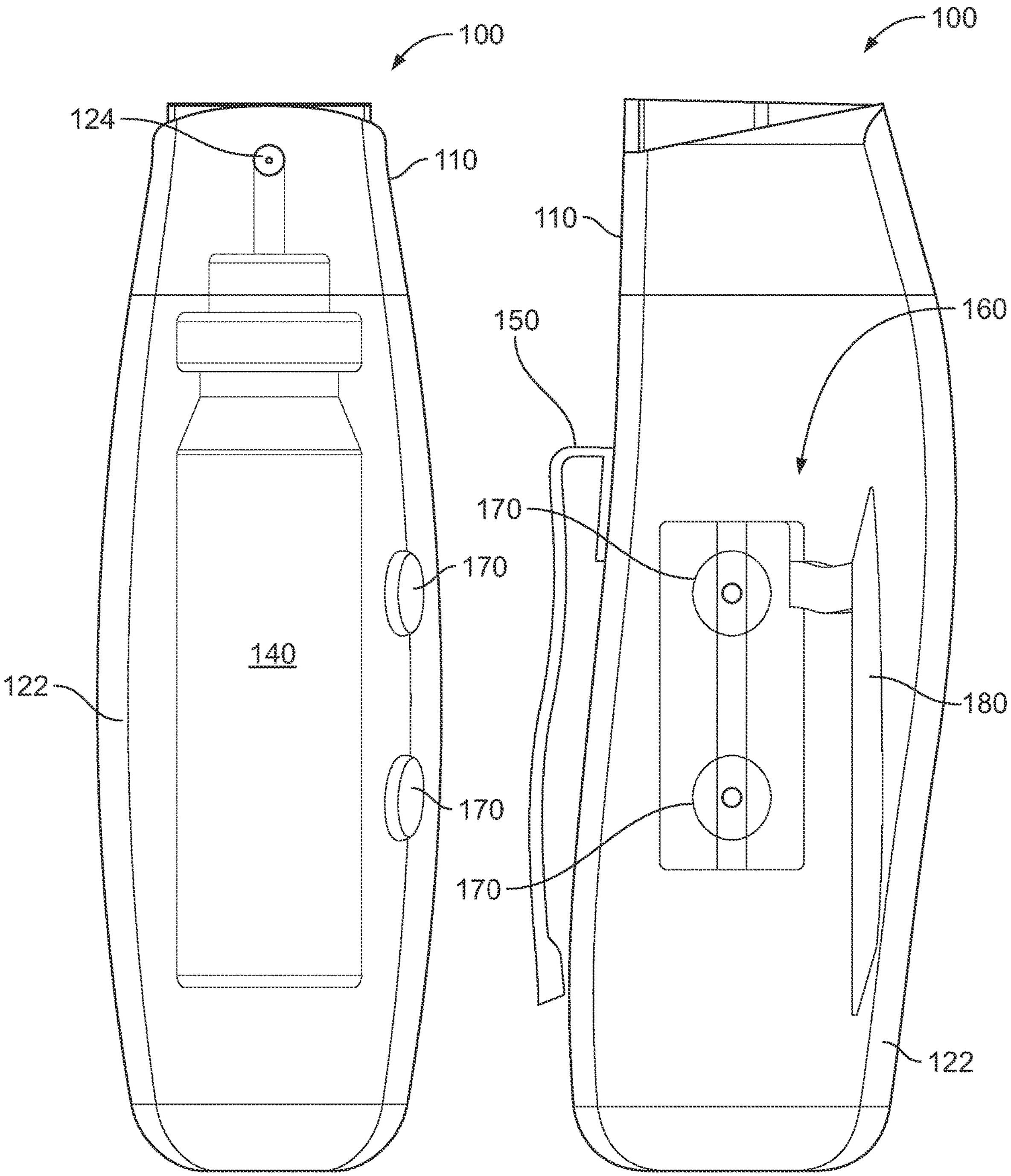
FIG. 8 include two side view of the self-defense device of FIG. 1 that depict internal components of the self-defense device.

As shown in FIGS. 4 and 8, the housing 110 defines a chamber 122 in which one or more internal components of the device 100 are housed. For example, the device 100 includes a cartridge 140 (also referred to as a “canister”) for pepper spray that is securely housed in the chamber 122. The device 100 also includes one or more batteries 170 and a printed circuit board 180 that are securely housed in the chamber 122. Some electrical components 160 of the device 100 are positioned on and/or coupled to the printed circuit board 180.

Additionally, the device 100 includes a spray nozzle 130 that is at least partially housed in the chamber 122 adjacent the upper end 112 of the housing 110. The spray nozzle 130 includes a body 132, a button 134 (also referred to as a “trigger”), and an outlet 136. The outlet 136 of the spray nozzle 130 is positioned adjacent to and aligns with a hole 124 defined by the housing 110. The body 132 of the spray nozzle 130 is configured to securely receive and connect to the cartridge 140 containing the pepper spray. The spray nozzle 130 and the cartridge 140 are arranged such that actuation of the button 134 causes the spray nozzle 130 to spray pepper spray out through outlet 136 and the hole 124 of the housing 110. For example, when a user presses the button 134, the spray nozzle 130 draws pepper spray from cartridge 140 (e.g., via a tube) and emits the pepper spray from the outlet 136 and through the hole 124. In some examples, the device 100 includes a cap (e.g., a cap 228 of FIG. 12) for the spray nozzle 130. The cap is configured to securely cover the button 134 of the spray nozzle 130 when the device 100 is not being used to prevent the spray nozzle 130 from being unintentionally activated.

The cartridge 140 may be a standard-sized cartridge for pepper spray and/or other inflammatory agents. For example, the cartridge 140 shown in FIGS. 4 and 8 is a ¼-ounce cartridge. The housing 110 of the device 100 is sized and shaped to house the cartridge 140 of a standard size in a sleek and compact manner. For example, the device 100 has a height of about 2.76 inches, a width of about 0.89 inches, and depth of about 1.00 inches to house the cartridge 140 in a compact manner.

Figure 7:
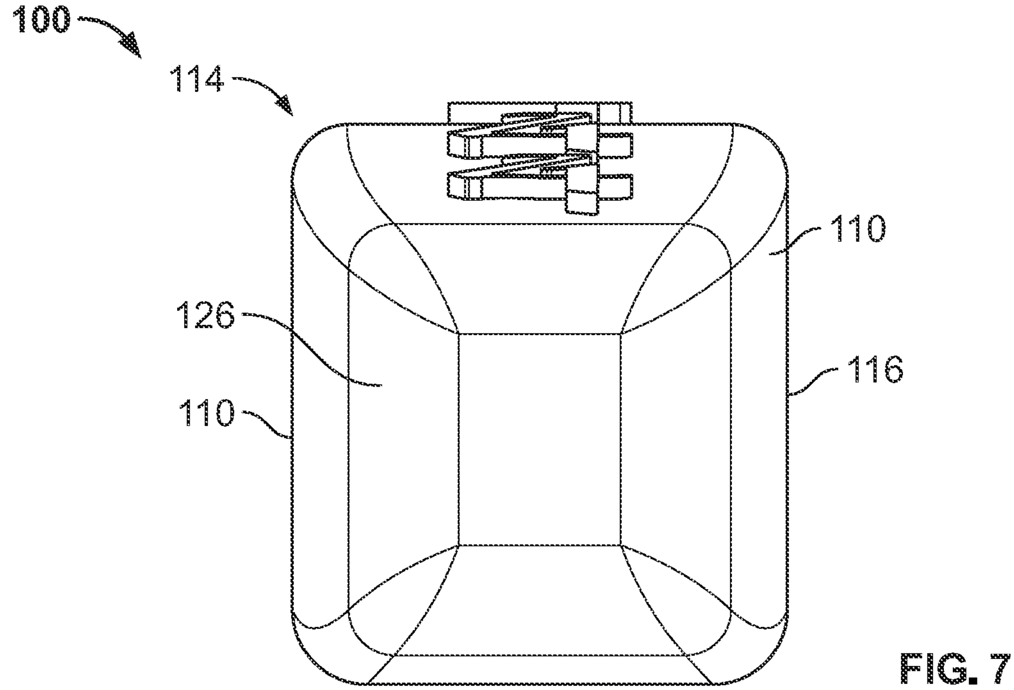
FIG. 7 is a bottom view of the self-defense device of FIG. 1.

As illustrated in FIG. 7, the housing 110 includes a door 126 at the lower end 114. The door 126 is configured to transition between a closed position and an open position. In the closed position, the door 126 securely encloses the cartridge 140 in the chamber 122 of the housing 110. In the open position, the door 126 provides access to the cartridge 140 to enable the cartridge 140 to be replaced with another when it becomes empty. In some examples, the door 126 is a hinged door, such as a spring-loaded hinged door. In other examples, the door 126 may be attached to the shell bodies 118, 120 of the housing 110 via one or more fasteners and may be detached from the shell bodies 118, 120 when the fastener(s) are removed. In some examples, a glass breaker is located on an outer surface of the door 126. The glass breaker is made of hard material (e.g., steel, an aluminum alloy, and/or other hard metal). In some examples, the glass breaker has a sharp, pointed tip that further facilitates it in breaking through tempered glass and/or other surface(s). Further, in some examples, the glass breaker is positioned on the door 126 to break through tempered glass and/or other surface(s). In other examples, the glass breaker may be positioned along other outer surface(s) of the housing 110.

Figure 5:
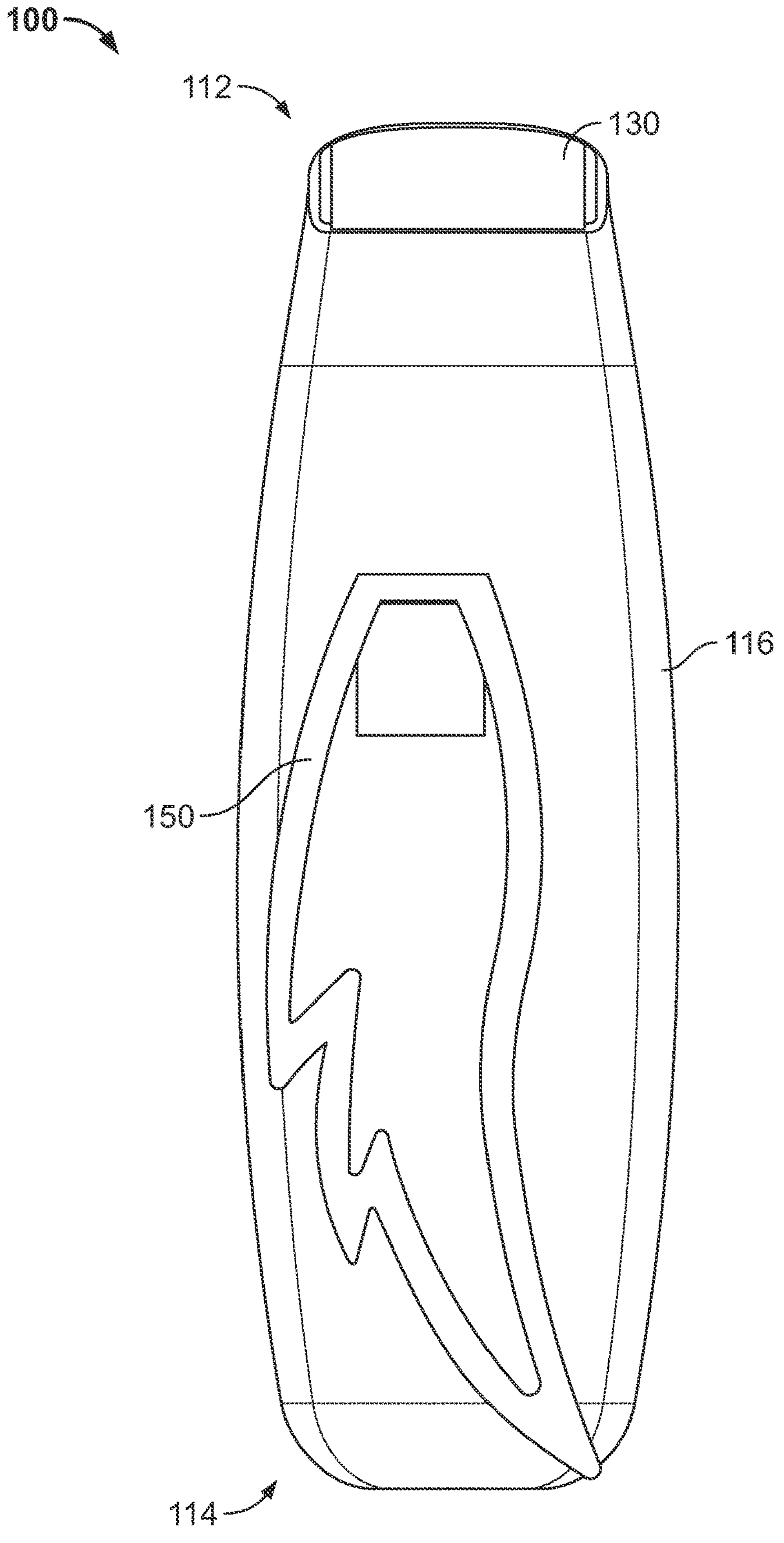
FIG. 5 is a rear view of the self-defense device of FIG. 1.
Figure 6:
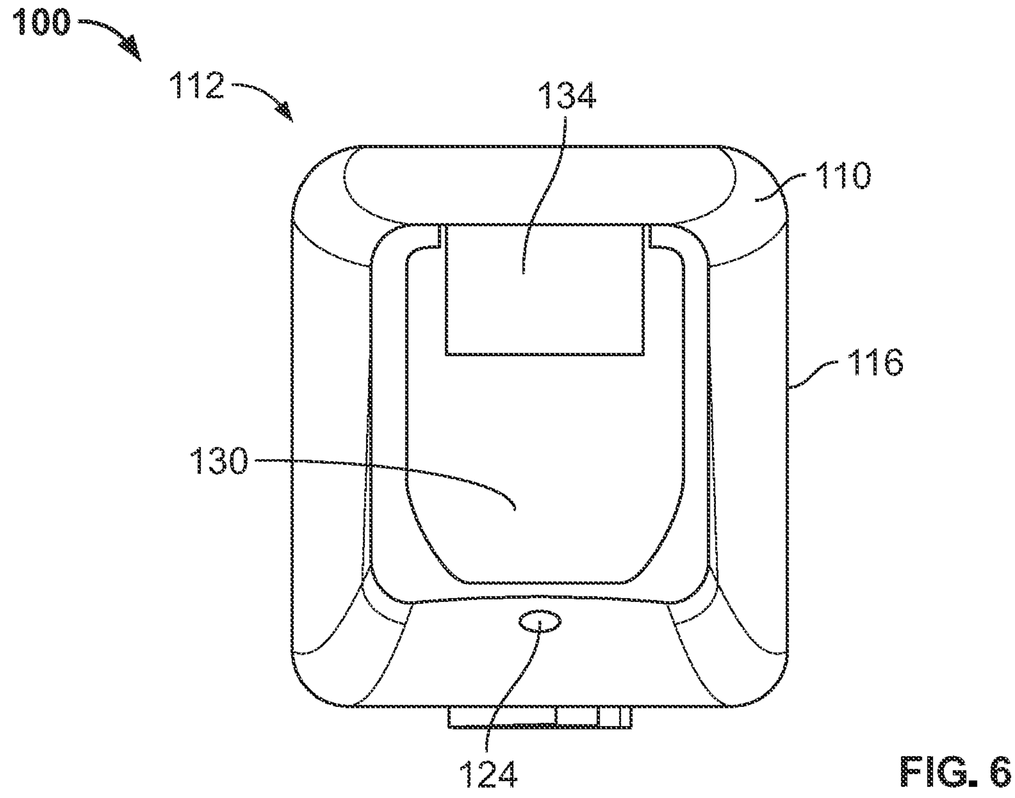
FIG. 6 is a top view of the self-defense device of FIG. 1.

As shown in FIG. 5, the device 100 of the illustrated example includes a clip 150. The clip 150 is attached to one or more of the side wall(s) 116 (e.g., via one or more fasteners). The clip 150 enables the device 100 to be securely fasten the device 100 to a surface, such as a waistband, a pocket, a liner, a mobile device, etc. In the illustrated example, the clip 150 is configured to rotate to facilitate the user in fastening the device 100 to a surface. For example, the clip 150 may be configured to rotate in a full circle (e.g., 360 degrees) and/or in a partial circle. In some examples, the clip 150 includes magnetic material to further facilitate the user in fastening the device 100 to a magnetic surface (e.g., such as a magnetic surface of a mobile device or cover). In other examples, the magnetic material is located along the side wall(s) 116 of the housing 110. Additionally or alternatively, the clip 150 may include and/or form a glass breaker that is configured to break through tempered glass and/or other surface(s). In such examples, the clip 150 is made of hard material (e.g., steel, an aluminum alloy, and/or other hard metal) to enable it to break the glass and/or other surface. Additionally or alternatively, the clip 150 has a sharp, pointed tip that further facilitates it in breaking through tempered glass and/or other surface(s).

Returning to FIG. 8, the device 100 of the illustrated example includes electrical components 160 that are securely housed in the chamber 122. One or more of the electrical components 160 are located on a printed circuit board 180. One or more batteries 170 are connected to the printed circuit board 180 to power others of the electrical components 160 of the device 100.

Figure 9:
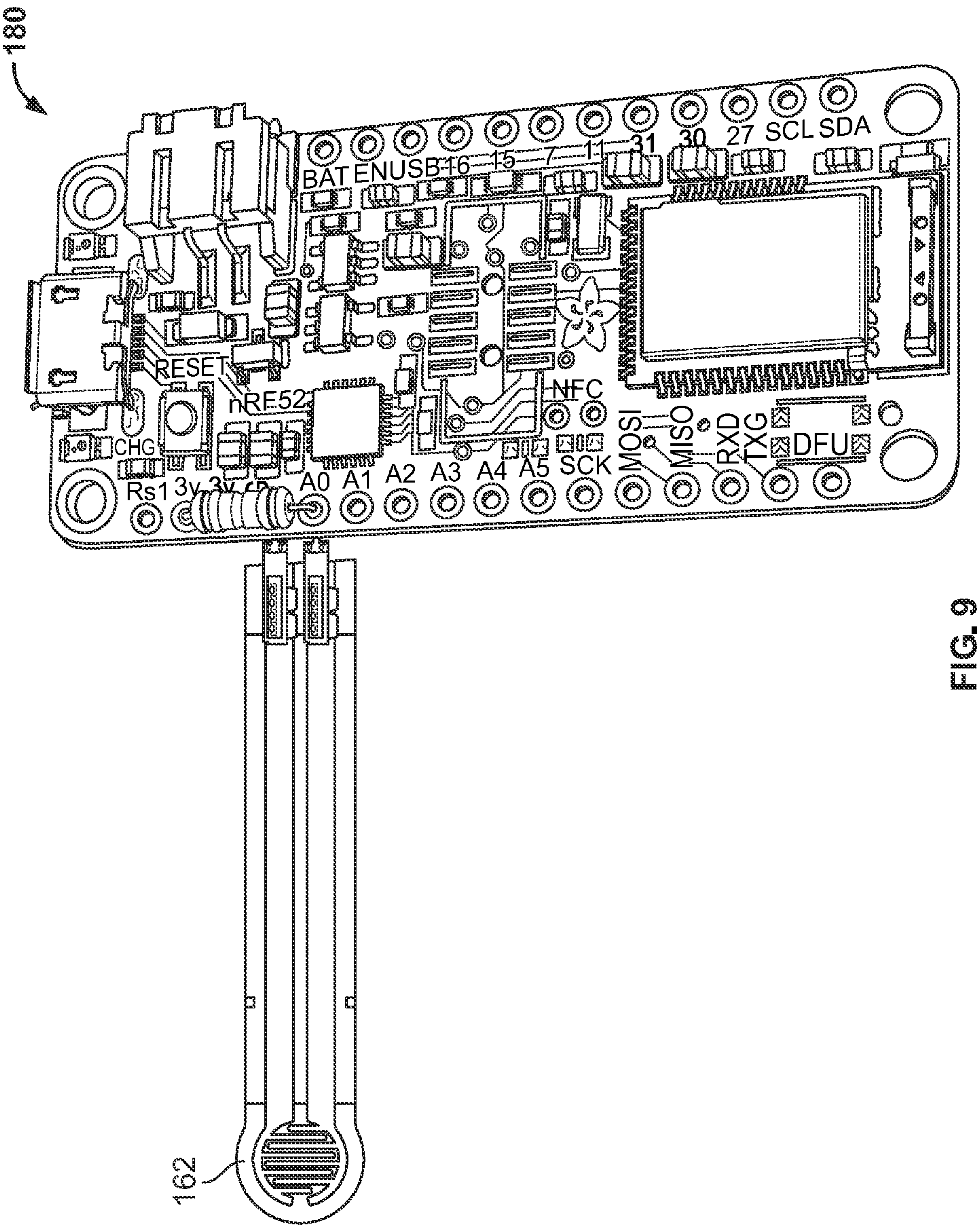
FIG. 9 depicts a printed circuit board of the self-defense device of FIG. 1.

Turning to FIG. 9, the electrical components 160 of the self-defense device (e.g., the device 100 of FIGS. 1-8, a device 200 of FIGS. 11-12, a device 300 of FIGS. 13-19, etc.) include a sensor 162 configured to detect when the spray nozzle 130 is spraying the inflammatory agent. For example, the sensor 162 is a pressure sensor (e.g., a pressure plate). A proximal end of the pressure sensor is connected to the printed circuit board 180, and a distal end of the pressure sensor extends from the printed circuit board 180 and is securely fixed to a portion of the spray nozzle 130. The pressure sensor is configured to detect a change in pressure when the button 134 of the spray nozzle 130 is pressed, thereby detecting when the inflammatory agent is being sprayed. In the illustrated example, the sensor 162 includes a pressure plate that is located at the distal end of the sensor 162. The button 134 is configured to simultaneously activate both the pressure plate and the cartridge 140 such that use of the inflammatory agent is instantaneously detected and reported. In other examples, the sensor 162 may be any other type of sensor (e.g., a proximity sensor, a motion sensor, etc.) that is capable of detecting activation of the spray nozzle 130.

Figure 10:
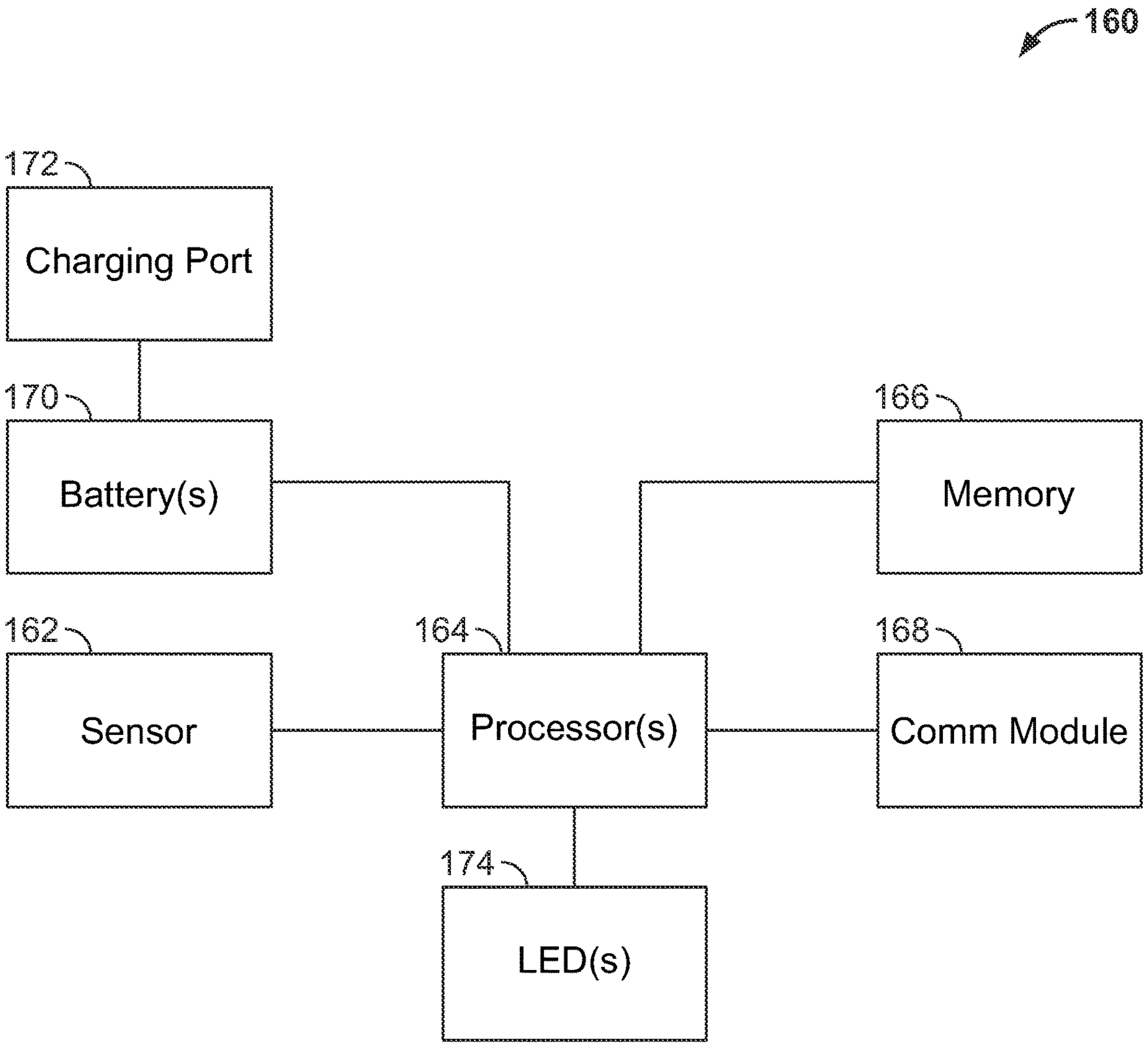
FIG. 10 is a block diagram of electronic components of the self-defense device of FIG. 1.
Figure 11:
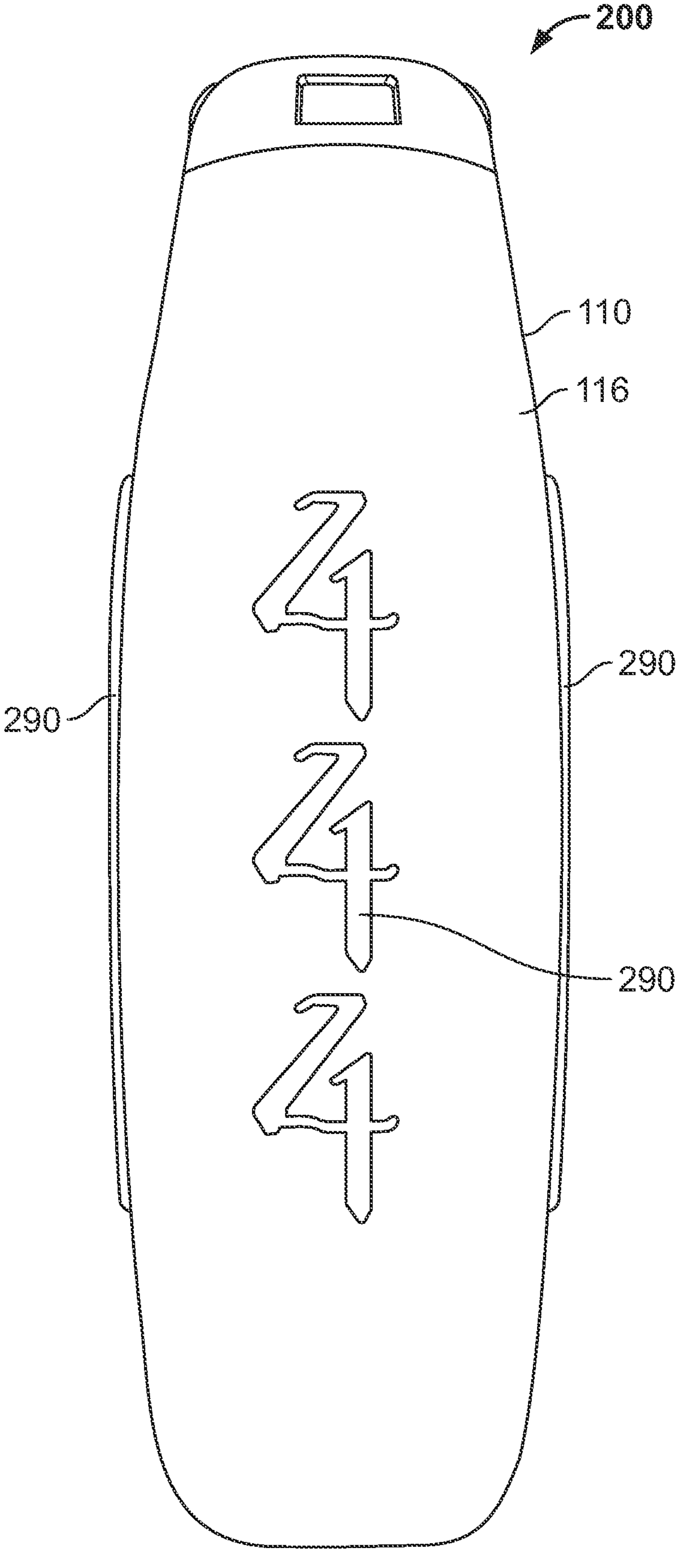
FIG. 11 is a front view of another example self-defense device in accordance with the teachings herein.
Figure 12:
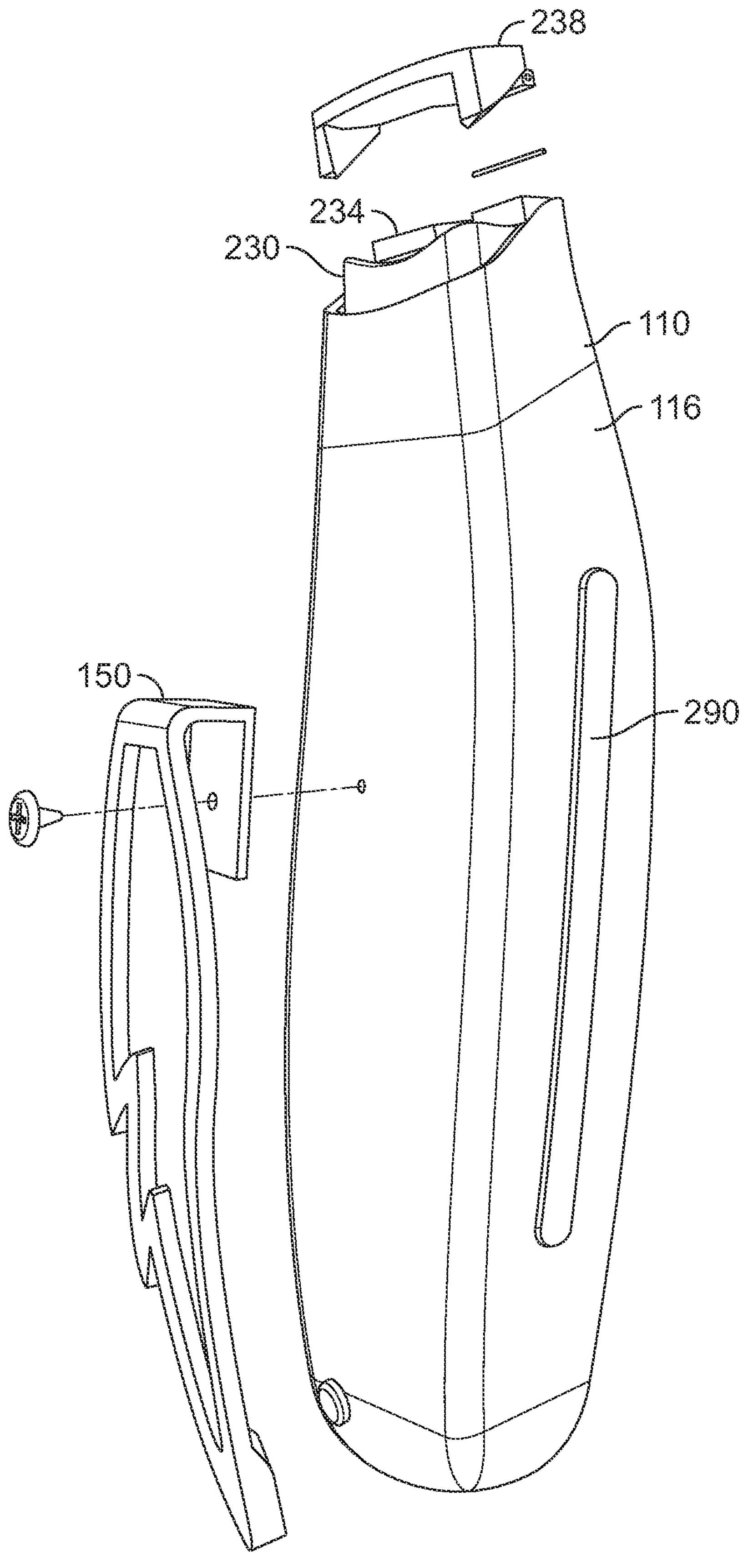
FIG. 12 is a partially exploded view of the self-defense device of FIG. 11.

FIG. 10 is a block diagram of the electrical components 160 of the self-defense device (e.g., the device 100 of FIGS. 1-8, the device 200 of FIGS. 11-12, the device 300 of FIGS. 13-19, etc.). In the illustrated example, the electrical components 160 include the sensor 162, one or more processor(s) 164, memory 166, a communication module 168, the one or more batteries 170, a charging port 172, and one or more light-emitting diodes (LEDs) 174. One or more of the electrical components 160, such as the processor(s) 164, the memory 166, the communication module 168, and the LED(s) 174 may be positioned on the printed circuit board 180.

The processor(s) 164 may be any suitable processing device or set of processing devices such as, but not limited to, a microprocessor, an integrated circuit, etc. The memory 166 may include volatile memory, non-volatile memory, unalterable memory, read-only memory, high-capacity storage devices, etc. The memory 166 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 166, the computer readable medium, and/or within the processor(s) 164 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The communication module 168 is configured to enable wired or wireless communication with network(s) and/or other computer device(s) (e.g., mobile devices). As used herein, the term "module" refers to hardware with circuitry configured to perform one or more functions. A "module" may also include firmware that executes on the circuitry to enable the one or more functions to be performed. The network may be a public network, such as the Internet; a private network, such as an intranet; or combinations thereof. The network may utilize a variety of networking protocols. The communication module 168 includes wired or wireless network interfaces to enable communication with the network(s) and/or other computing device(s). The communication module 168 also includes hardware (e.g., processors, memory, storage, antenna, etc.) and software to control the wired or wireless network interfaces. For example, the communication module 168 includes hardware, software, and network interfaces for communication via wireless personal area network (WPANs), such as Bluetooth®; etc. In such examples, the communication module 168 enables the self-defense device (e.g., the device 100, the device 200, the device 300, etc.) to be paired with another nearby computing device of the user, such as a mobile device (e.g., a mobile phone, a smartwatch, etc.). Additionally or alternatively, the communication module 168 includes hardware, software, and network interfaces for communication via cellular network(s), such as Long-Term Evolution (LTE); wireless local area networks (WLANs), such as Wi-Fi®; etc.

In some examples, each of the one or more batteries 170 are coin-sized batteries to reduce their footprint within the chamber 122, thereby enabling the self-defense device (e.g., the device 100, the device 200, the device 300, etc.) to be compact. The one or more batteries 170 are rechargeable and electrically connected to the charging port 172 (e.g., a USB-C connection). The LED(s) 174 may be configured to emit light prior, during, and/or upon use of the self-defense device to facilitate the user in locating and/or correctly orienting the self-defense device. In some examples, the LED(s) 174 are configured to emit light of different colors and/or in different patterns for different respective statuses of the self-defense device. For example, the LED(s) 174 may emit a first color and/or pattern to indicate that the communication module 168 is pairing with a computer device, a second color and/or pattern to indicate that the spray nozzle 130 is spraying the inflammatory agent, and/or a third color and/or pattern to indicate that the batteries 170 have a low charge level.

In operation, as disclosed below in greater detail with respect to FIG. 20, the electrical components 160 enable the self-defense device to alert, in real-time, one or more preselected emergency contacts in response to the user spraying the inflammatory agent from the self-defense device. As a result, the self-defense device is configured to alert one or more those emergency contacts that the user may currently be in danger. For example, when the communication module 168 is configured to communicate via a WPAN, such as Bluetooth®, the communication module 168 is paired with a mobile device (e.g., a mobile phone, a smartwatch, etc.) of the user. When the user presses the button 134 of the spray nozzle 130 to spray the inflammatory agent, the sensor 162 detects that the self-defense device is spraying the inflammatory agent. In response to identifying that the sensor 162 has detected use of the inflammatory agent, the processor 164 causes the communication module 168 to send a signal indicating that the user has used their self-defense device.

The mobile device receives the signal from the self-defense device and relays the signal to a remote server. In turn, the remote server is configured to transit an alert to one or more preselected emergency contacts (e.g., friends, family, partner, security company, etc.) of the user. For example, the remote server is configured to transmit the alert via a text message (e.g., SMS text messaging), an email, a phone call, a pop-up in an app, etc.

The mobile device may also collect other information, in real-time, associated with the occurrence. For example, the mobile device may identify its geolocation, via a global positioning system (GPS) receiver, and relay its geolocation to the remote server. The mobile device may also collect a description or an incident report from the user via an app on their mobile device (e.g., a mobile app). In some examples, the remote server uses the geolocation, incident report, and/or other data to identify trends in reported incidences.

FIGS. 11-12 illustrate another example self-defense device 200 in accordance with the teachings herein. The self-defense device 200 includes components that are identical or substantially similar to that of the device 100. For example, the device 200 of the illustrated example includes the housing 110, the spray nozzle 130, the cartridge 140, the clip 150, the electrical components 160, the printed circuit board 180, and the glass breaker. Because those components are disclosed in detail with respect to the device 100 of FIGS. 1-10, some features of those components are not disclosed again in further detail below with respect to the device 200.

As illustrated in FIGS. 11-12, the device 200 includes one or more windows 290 along the side wall(s) 116 of the housing 110. The window(s) 290 enable light emitted by the LED(s) 174 to illuminate portions of the outer surface of the housing 110. In the illustrated example, the window(s) 290 are in the shape of a logo and vertical line(s) extending along the side wall(s) 116 of the housing 110. Additionally, as shown in FIG. 12, the spray nozzle 130 includes a cap 238 that is configured to securely cover the button 134 when the device 200 is not being used by the user. The cap 238 is configured to cover the button 134 to prevent the spray nozzle 130 from being unintentionally activated.

FIGS. 13-19 illustrate another example self-defense device 300 in accordance with the teachings herein. The self-defense device 300 includes components that are identical or substantially similar to that of the device 100. For example, the device 30 of the illustrated example includes the cartridge 140, the electrical components 160, and the printed circuit board 180. Because those components are disclosed in detail with respect to the device 100 of FIGS.

1-10, some features of those components are not disclosed again in further detail below with respect to the device 300.

Figure 13:
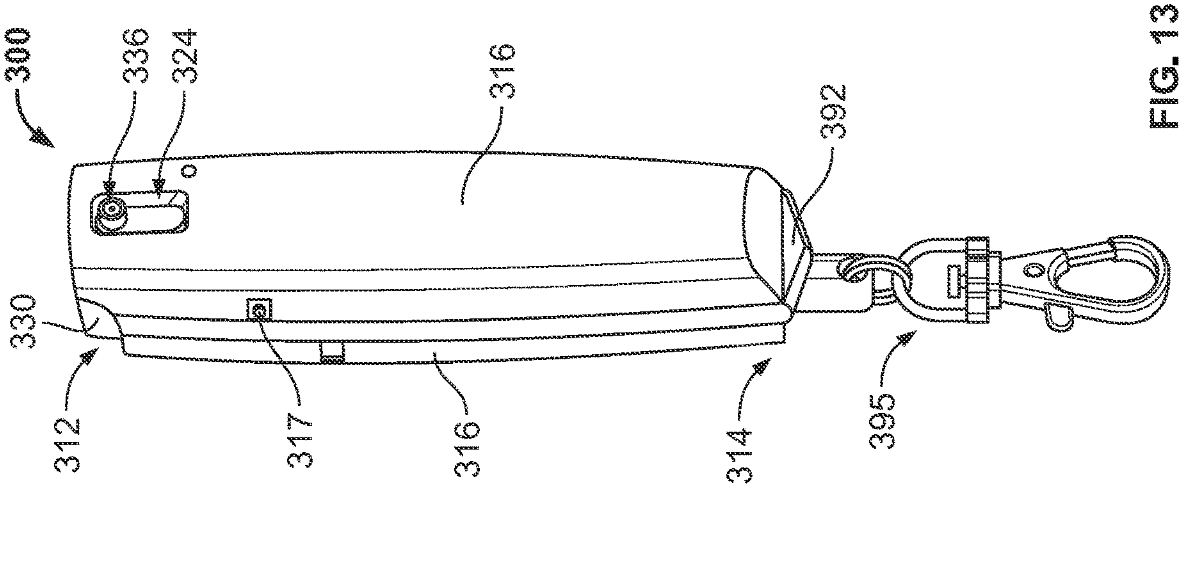
FIGS. 13-15 depict another example self-defense device in accordance with the teachings herein.
Figure 14:
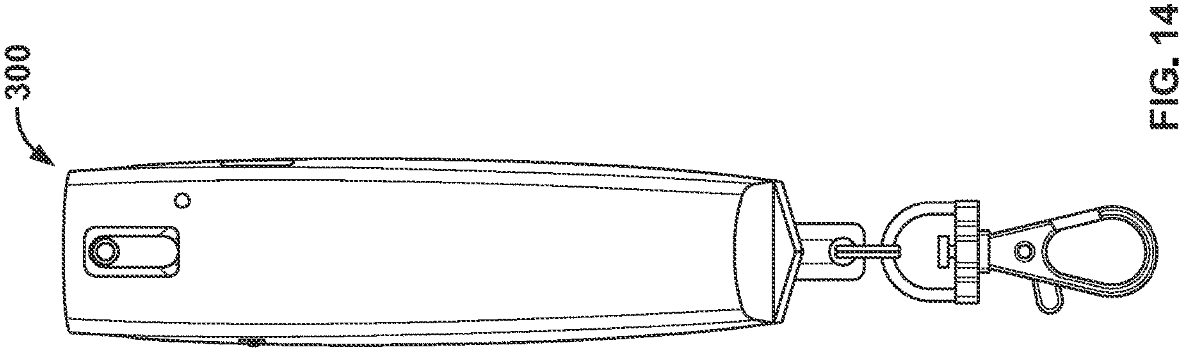
Figure 15:
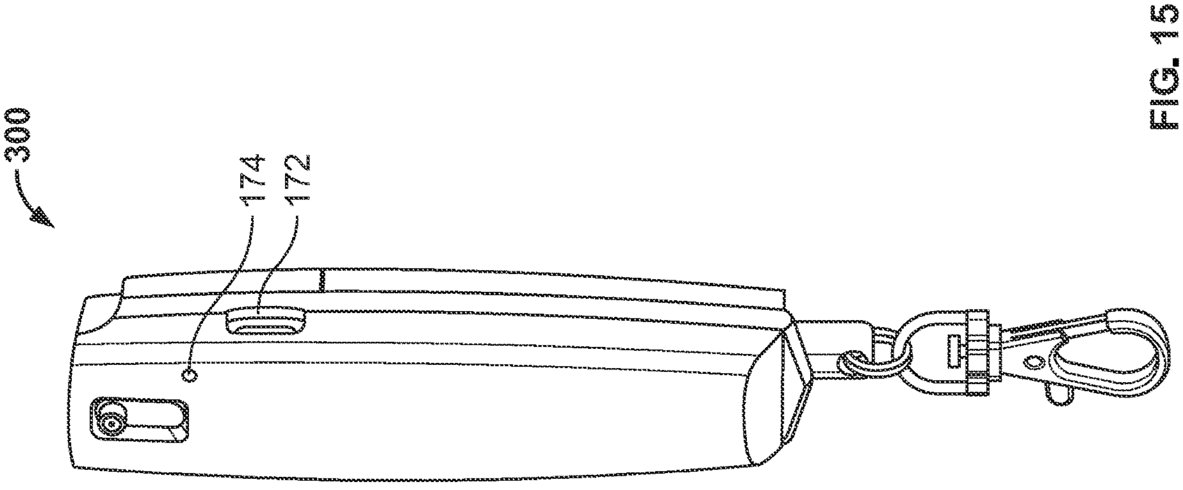

In the illustrated example, the self-defense device 300 (also referred to as "the device") is a pepper spray device that is configured to emit pepper spray and/or other inflammatory agents. As shown in FIGS. 13-15, the device 300 includes a housing 310 with an upper end 312 and a lower end 314. The housing 310 includes one or more side walls 316 that extend between the upper end 312 and the lower end 314. The housing 310 of the device 300 is sized and shaped to house the cartridge 140 of a standard size (e.g., a ¼-ounce cartridge) in a sleek and compact manner.

Figure 19:
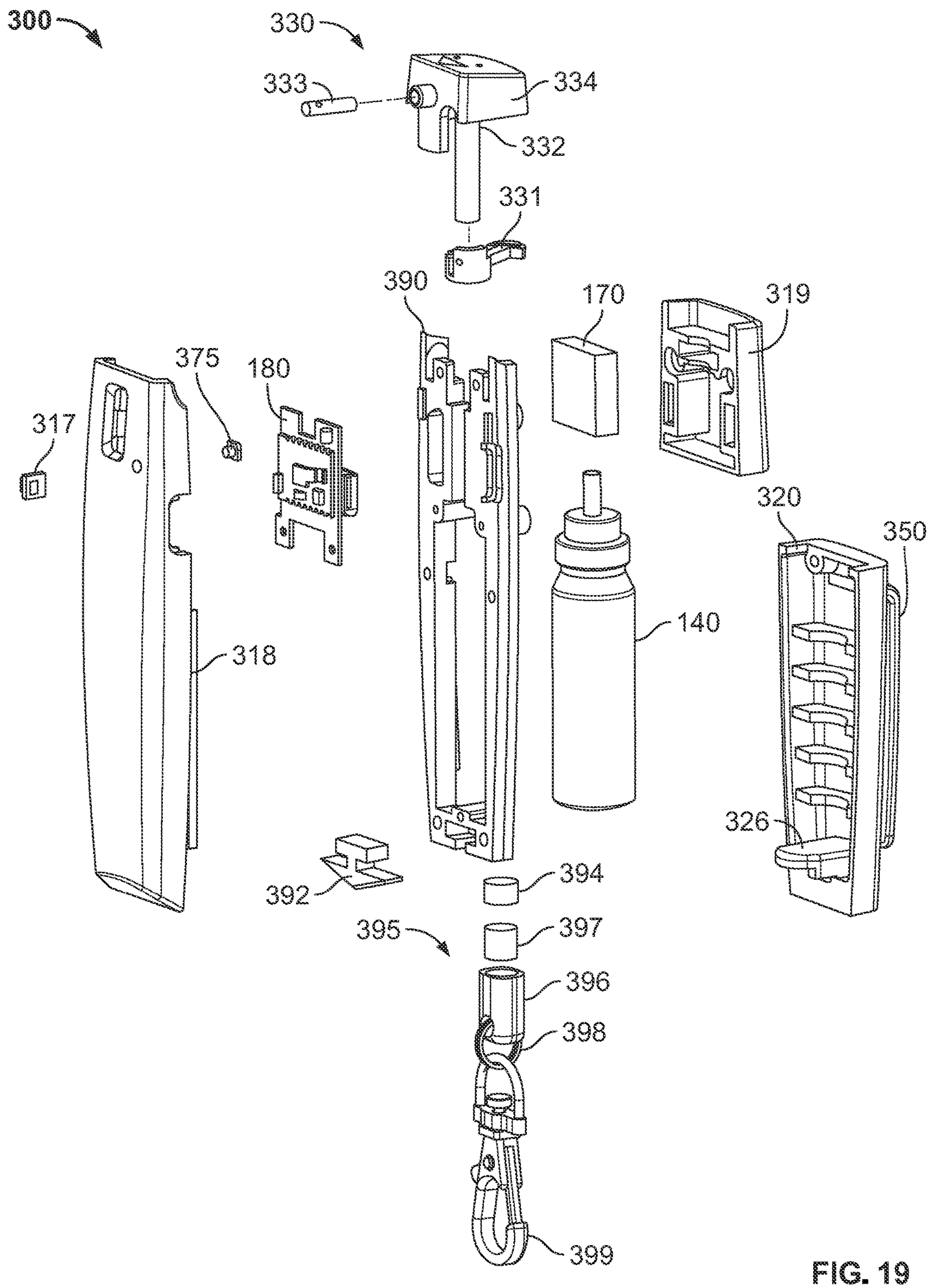
FIG. 19 is an exploded view of the self-defense device of FIGS. 13-15.

The housing 310 is formed from one or more shell bodies. As shown in FIG. 19, the housing 310 of the illustrated example is formed from a shell body 318 (also referred to as a "first shell body" or a "first shell"), a shell body 319 (also referred to as a "second shell body" or a "second shell"), and a shell body 320 (also referred to as a "third shell body" or a "third shell"). The shell bodies 318, 319, 320 are coupled together (e.g., via fasteners) to form the housing 310. The shell bodies 318, 319, 320 and/or the housing 310 may be formed of carbon fiber, aluminum, and/or other sturdy and aesthetically pleasing material.

Figure 16:
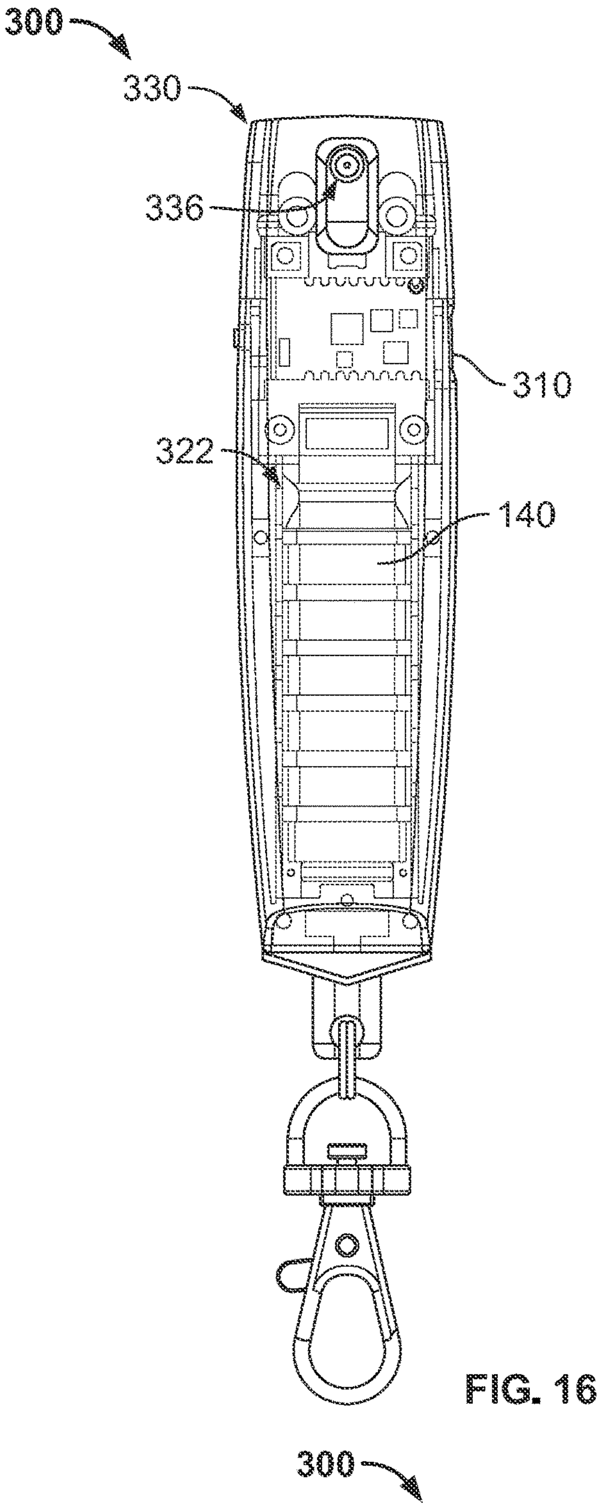
FIG. 16 is a front view of the self-defense device of FIGS. 13-15 that depict internal components of the self-defense device.
Figure 17:
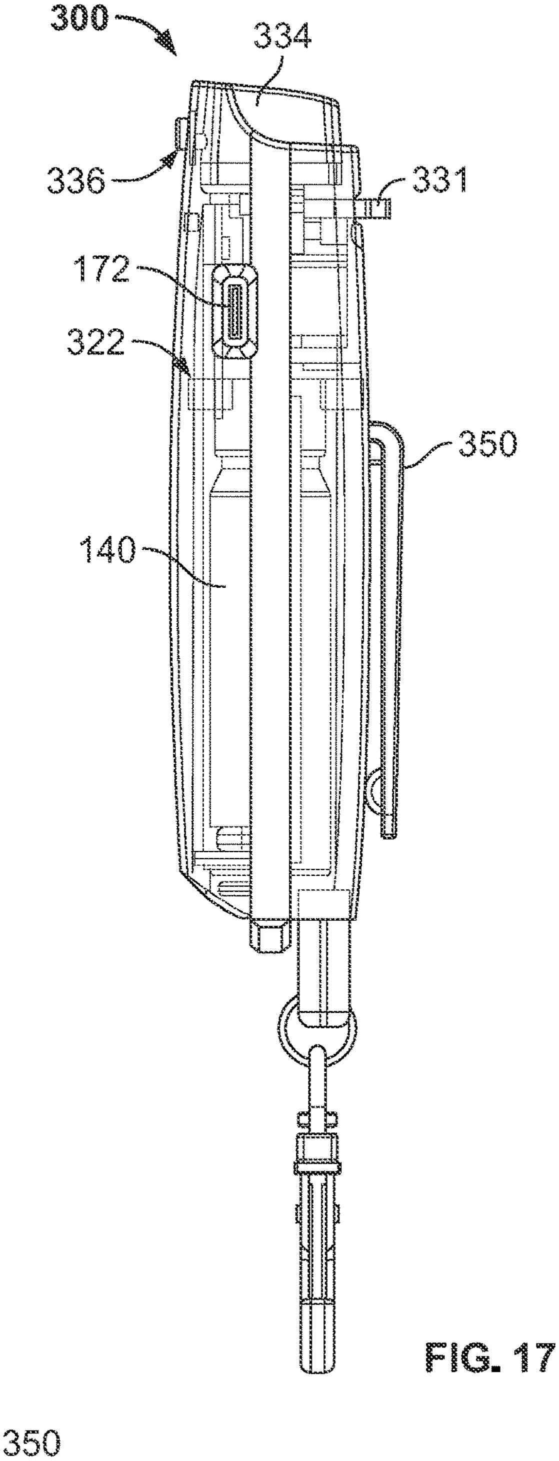
FIG. 17 is a side view of the self-defense device of FIGS. 13-15 that depict internal components of the self-defense device.
Figure 18:
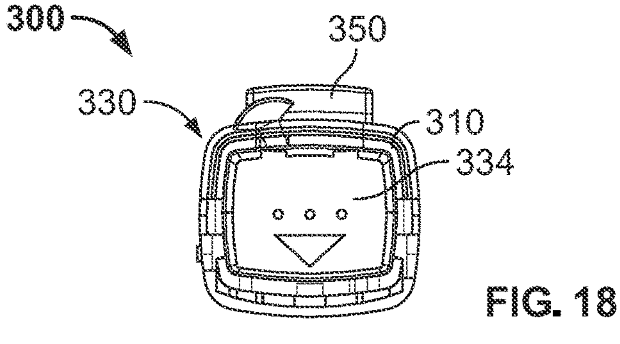
FIG. 18 is a top view of the self-defense device of FIGS. 13-15 that depict internal components of the self-defense device.

As shown in FIGS. 16-17, the housing 310 defines a chamber 322 in which one or more internal components of the device 300 are housed. For example, the device 300 includes the cartridge 140 for pepper spray that is securely housed in the chamber 322. The device 300 also includes a switch 317 located along the exterior of the housing. The switch 317 is configured to enable a user to turn the electrical components 160 on and off.

The one or more batteries 170 (FIG. 19), the printed circuit board 180 (FIG. 19), and other electrical components 160 of the device 300 are securely housed in the chamber 322. As shown in FIGS. 15 and 17, the device 300 includes the charging port 172 (e.g., a USB-C connection) of the electrical components 160 for recharging the one or more batteries 170. Some of the electrical components 160 (FIG. 10), such as the sensor 162, are positioned on and/or coupled to the printed circuit board 180. The sensor 162, for example, includes a pressure plate that is configured to be activated simultaneously with the cartridge 140 (e.g., by a button 334 of a spray nozzle 330) such that use of the inflammatory agent is instantaneously detected and reported. The LED(s) 174 shown in FIG. 15 may be positioned on and/or connected to the printed circuit board 180. As shown in FIG. 19, the device 300 include a lightguide 375 that directs light emitted by the LED(s) 174, which is positioned on the printed circuit board 180 that is located within the chamber 322, to the exterior of the device 300.

The device 300 also includes a spray nozzle 330 that is at least partially housed in the chamber 322 adjacent the upper end 312 of the housing 310. As shown in FIG. 19, the spray nozzle 330 includes a safety clip 331, a body 332, a nozzle insert 333, a button 334, and an outlet 336. As shown in FIGS. 13-15, the outlet 336 of the spray nozzle 330 is positioned adjacent to and aligns with a hole 324 defined by the housing 310. The outlet 336 is defined by the nozzle insert 333, which, as shown in FIG. 19, is configured to securely and fluidly connect to a port defined by the body 332 and/or the button 334 of the spray nozzle 330. The body 332 of the spray nozzle 330 is configured to securely receive and connect to the cartridge 140 of the pepper spray.

In the illustrated example, the spray nozzle 330 is securely coupled to a frame 390 of the device 300. As shown in FIG. 19, the frame 390 includes a first end and an opposing second end. The spray nozzle 330 is secured to the first end (e.g., an upper end). The printed circuit board 180 also is securely coupled to a portion of the frame 390. Further, the frame 390 defines an opening between the first end and the second end). The cartridge 140 is configured to be positioned at least partially within the opening such that the spray nozzle 330 securely receives and connects to the cartridge 140 when the spray nozzle 300 is coupled to the first end of the frame 390.

The spray nozzle 330 and the cartridge 140 are arranged relative to the frame 390 such that actuation of the button 334 (also referred to as a "trigger") causes the spray nozzle 330 to spray pepper spray through the nozzle insert 333 and out through the outlet 336. For example, when a user presses the button 334, the spray nozzle 330 draws pepper spray from cartridge 140 (e.g., via a tube) and emits the pepper spray from the outlet 336 and through the hole 324. In the illustrated example, the safety clip 331 is configured to prevent the spray nozzle 130 from being unintentionally activated. For example, the safety clip 331 is positioned between the button 334 of the spray nozzle 330 and the frame 390. As shown in FIG. 17, the safety clip 331 includes a distal end that extends out beyond the housing 310 of the device 300. The distal end of the safety clip 331 is configured to be toggled (e.g., rotated) between a locked position and an unlocked position by the user. When the safety clip 331 is in the locked position, a portion of the safety clip 331 is positioned between button 334 and the frame 390 in a manner that prevents the button 340 from actuating relative to the frame 390 and, in turn, prevents the spray nozzle 330 from drawing the inflammatory agent from the cartridge 140. When the safety clip 331 is in the unlocked position, the safety clip 331 is positioned in a manner that enables the button 340 to actuate relative to the frame 390 and, in turn, enable the spray nozzle 330 to draw the inflammatory agent from the cartridge 140. In the illustrated example, the safety clip 331 is configured to be toggled horizontally about a longitudinal axis of the device 300 in a manner that is intuitive to and ergonomically friendly for a user.

Additionally, the device 300 includes a glass breaker 392. In the illustrated example, the glass breaker 392 is coupled to the second end (e.g., the lower end) of the frame 390. The glass breaker 392 is configured to break through tempered glass and/or other surface(s). The glass breaker 392 is made of hard material (e.g., steel, an aluminum alloy, and/or other hard metal) to enable it to break the glass and/or other surface. As shown in FIGS. 13-15, and 19, the glass breaker 392 has a sharp, pointed tip that further facilitates the glass breaker 392 in breaking through tempered glass and/or other surface(s). For example, the glass breaker 392 has a triangular shape with a vertex extending beyond and away from the lower end 314 of the housing 310 to enable the vertex of the glass breaker 392 to contact and break through tempered glass and/or other surface(s).

The frame 390 is made of relatively rigid material (e.g., steel, an aluminum alloy, and/or other metal(s)) to provide structural rigidity to the device 300. For example, the frame 390 is shaped and composed of relatively rigid material to enable the frame 390 and, in turn, the device 300 to withstand hard impact(s) of the glass breaker 392 hitting tempered glass and/or other hard surface(s). In the illustrated example, the frame 390 also defines holes that are configured to receive the fasteners that couple the housing 310 together. That is, the housing 310 is coupled together by securely fastening the shell bodies 318, 319, 320 of the housing 310 to the frame 390. In turn, the frame 390 is configured to improve the structural rigidity of the housing 310 of the device 300.

Further, as illustrated in FIG. 19, the housing 310 includes a door 326. The door 326 is configured to transition between a closed position and an open position. In the closed position, the door 326 is coupled to one or more of the shell bodies 318, 319, 320 to securely enclose the cartridge 140 in the chamber 322 of the housing 310. In the illustrated example, the door 326 is coupled to the shell body 320 (e.g., via fasteners). In the open position, the door 326 is decoupled from the shell bodies 318, 319, 320 to provide access to the cartridge 140 to enable the cartridge 140 to be replaced with another when it becomes empty. In other examples, the door 326 is a hinged door, such as a spring-loaded hinged door.

The device 300 of the illustrated example includes a clip 350. The clip 350 is attached to the housing 310. In the illustrated example, the clip 350 is attached to the shell body 320. Additionally or alternatively, the clip 350 is attached to the shell body 318 and/or the shell body 319. The clip 350 enables the device 300 to be securely fasten the device 300 to a surface, such as a waistband, a pocket, a liner, a mobile device, etc. In some examples, the clip 350 is configured to rotate to facilitate the user in fastening the device 300 to a surface. For example, the clip 350 may be configured to rotate in a full circle (e.g., 360 degrees) and/or in a partial circle. The clip 350 may include magnetic material to further facilitate the user in fastening the device 300 to a magnetic surface (e.g., such as a magnetic surface of a mobile device or cover). In other examples, magnetic material may be located along one or more of the side wall(s) 316 of the housing 310.

The device 300 also includes a keychain 395 that is attached to the housing 310 and configured to securely fasten the device 300 to another object of the user. In the illustrated example, the keychain 395 includes an anchor 396, a magnet 397, a ring 398, and a carabiner 399. The magnet 397 is securely housed in the anchor 396, the anchor 396 is coupled to the ring 398, and the ring 398 is coupled to the carabiner 399. Further, the keychain 395 is magnetically coupled to the housing 310. For example, a magnet 394 is fixedly coupled to the housing 310. The magnet 397 of the keychain 395 is configured to magnetically couple to the magnet 394 of the housing 310 to couple the keychain 395 to the housing 310.

Figure 20:
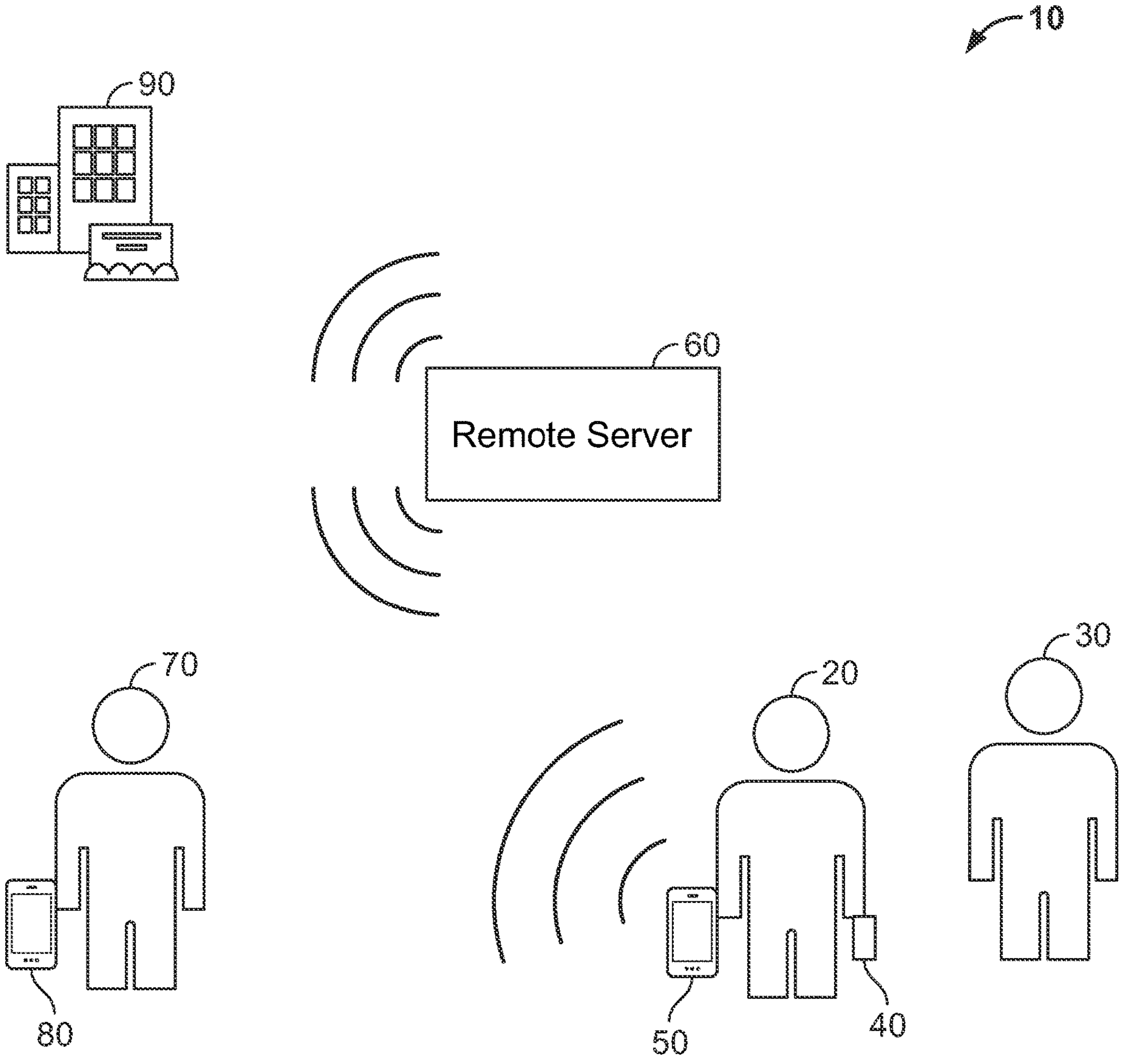
FIG. 20 depicts an example environment in which a self-defense device is used with an example alert system in accordance with the teachings herein.

FIG. 20 depicts an example environment in which an alert system 10 including a self-defense device 40, a mobile device 50, and a remote server 60 is used by and/or for a user 20. The self-defense device 40 may include the self-defense device 100, the self-defense device 200, and/or any other self-defense device capable of sending, in real-time, a wireless alert signal upon spraying an inflammatory agent.

The mobile device 50 (e.g., a mobile phone, a smart watch, etc.) of the illustrated example includes processor(s) and memory. The processor(s) may be any suitable processing device or set of processing devices. The memory may include volatile memory, non-volatile memory, unalterable memory, read-only memory, high-capacity storage devices, etc. The memory is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory, the computer readable medium, and/or within the processor(s) during execution of the instructions.

The mobile device 50 also includes a touchscreen, a GPS receiver, and/or a clock. The touchscreen is configured to present one or more interfaces of a mobile app (e.g., interfaces 1010, 1020, 1030, 1040 of FIGS. 15-18, respectively) that enables the self-defense device 40 to communicate with the remote server 60 via the mobile device 50. The GPS receiver is configured to identify a current location of the mobile device 50, for example, when the mobile device 50 receives a signal that the self-defense device 40 has been used. The clock is configured to identify a current time (e.g., a timestamp), for example, when the mobile device 50 receives a signal that the self-defense device 40 has been used.

In the illustrated example, the self-defense device 40 is communicatively connected to the mobile device 50, and the mobile device 50 is communicatively connected to the remote server 60. For example, the self-defense device 40 is communicatively connected to the mobile device 50 via a wireless personal area network (WPAN) connection, such as Bluetooth®. The mobile device 50 is communicatively connected to the remote server 60, for example, via cellular network(s), such as Long-Term Evolution (LTE). With the mobile device 50 serving as a communicative relay, the self-defense device 40 is able to communicate with the remote server 60 without needing to incorporate relatively expensive hardware for cellular communication. Additionally, the remote server 60 is able to collect information originating from the self-defense device 40 and/or originating from the mobile device 50. In other examples, the self-defense device 40 may be configured to communicate directly with the remote server 60.

In operation, the alert system 10 is configured to alert, in real-time, one or more emergency contacts 70, 90 preselected by the user 20 in response to the user 20 spraying the inflammatory agent from the self-defense device 40. For example, when the user presses a button of a spray nozzle of the self-defense device 40 (e.g., the button 134 of the spray nozzle 130) to spray inflammatory agent toward an assailant 30, a sensor of the self-defense device 40 (e.g., the sensor 162) detects that the self-defense device 40 is spraying the inflammatory agent. In response, a processor of the self-defense device 40 (e.g., the processor 164) instructs a communication module of the self-defense device 40 (e.g., the communication module 168) to send a signal, via WPAN communication, indicating that the user 20 has used the self-defense device 40.

The mobile device 50 receives the signal from the self-defense device 40 and relays the signal to the remote server 60. In turn, the remote server 60 is configured to transit an alert to one or more of the emergency contacts 70, 90 of the user 20. For example, the remote server 60 is configured to transmit the alert via a text message (e.g., SMS text messaging), an email, a phone call, a pop-up in an app, etc. In the illustrated example, the emergency contact 70 is a person (e.g., a family member, a friend, a spouse, etc.) of the user 20. In other examples, the self-defense device 40 and/or the mobile device 50 may be configured to send the alert directly to the emergency contacts 70, 90. Further, in the illustrated example, the remote server 60 is configured to transmit the alert to a computing device 80, such as a mobile device, of the emergency contact 90. The emergency contact 90 of the illustrated example is an organization, such as a security company, which may be able to further facilitate the user 20 in fleeing from the assailant 30.

The mobile device 50 also is configured to collect other information, in real-time, associated with use of the self-defense device 40. For example, the mobile device 50 is configured to identify its geolocation, via the GPS receiver, and relay its geolocation to the remote server 60. The mobile device 50 also is configured to collect a timestamp when it receives a signal from the self-defense device 40 and relay the timestamp to the remote server 60. Additionally or alternatively, the mobile device 50 is configured to collect a description of the incident and/or the assailant 30 from the user 20 via a mobile app installed on the mobile device 50. The alert sent by the remote server 60 to the emergency contacts 70, 90 may include the geolocation, the timestamp, and/or other information to enable the emergency contacts 70, 90 to facilitate the user 20 in fleeing from the assailant 30.

Figure 21:
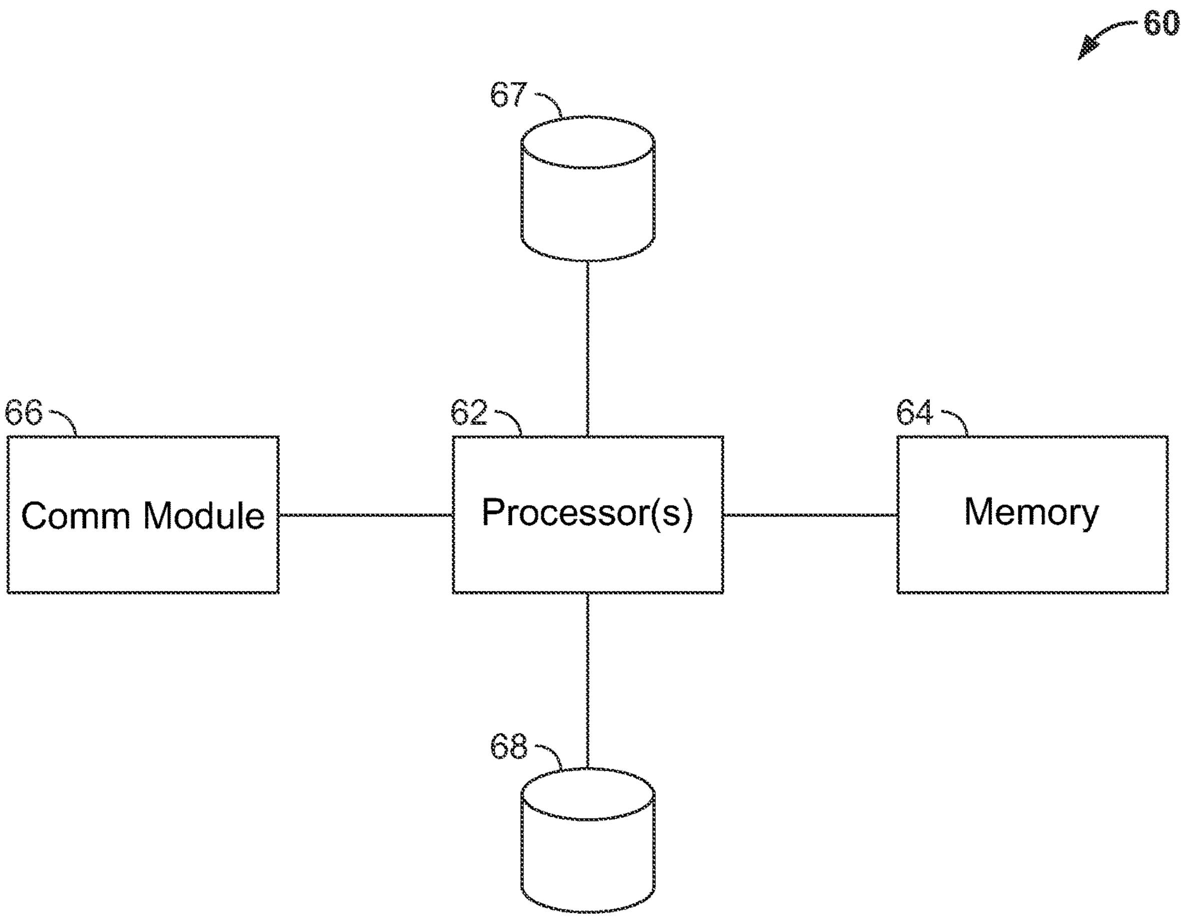
FIG. 21 is a block diagram of electronic components of the alert system of FIG. 20.

FIG. 21 is a block diagram of the remote server 60 of the alert system 10. In the illustrated example, the remote server 60 includes one or more processor(s) 62, memory 64, a communication module 66, a contacts database 67, and an events database 68.

The processor(s) 62 may be any suitable processing device or set of processing devices. The memory 64 may include volatile memory, non-volatile memory, unalterable memory, read-only memory, high-capacity storage devices, etc. The memory 64 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 64, the computer readable medium, and/or within the processor(s) 62 during execution of the instructions.

The contacts database 67 is configured to store information of the emergency contacts 70, 90 preselected by the user 20. For example, the contacts database 67 is configured to store a name, a phone number, an email address, etc. of each of the emergency contacts 70, 90 preselected by the user 20. The processor(s) 62 of the remote server 60 are configured to retrieve the contact information of the emergency contacts 70, 90 upon receiving a signal via the communication module 66 that the user 20 has used the self-defense device 40. The processor(s) 62 used the retrieved contact information to subsequently send an alert to the emergency contacts 70, 90 of the user 20.

The events database 68 is configured to store information associated with the event for which the user 20 used the self-defense device 40. For example, the events database 68 is configured to store a description of the event, a description of the assailant, a time stamp of the event, the number of sprays, a location of the event, and/or other information associated with the event that the remote server 60 has received from the mobile device 50 of the user 20. The processor(s) 62 of the remote server 60 are configured to retrieve the information stored in the events database 68 to facilitate analysis of the particular event and/or to identification of trends in reported incidences.

In the illustrated example, the contacts database 67 and the events database 68 are separate databases. In other examples, the remote server 60 may include more or fewer database(s). For example, remote server 60 may include a single database may include the contacts database 67 and the events database 68.

The communication module 66 is configured to enable wired or wireless communication with network(s) and/or other computer device(s), such as the mobile device 50 and/or the self-defense device 40. The network may be a public network, such as the Internet; a private network, such as an intranet; or combinations thereof. The network may utilize a variety of networking protocols. The communication module 66 includes wired or wireless network interfaces to enable communication with the network(s) and/or other computing device(s). The communication module 66 also includes hardware (e.g., processors, memory, storage, antenna, etc.) and software to control the wired or wireless network interfaces. For example, the communication module 66 includes hardware, software, and network interfaces for communication via cellular network(s), such as Long-Term Evolution (LTE); wireless local area networks (WLANs), such as Wi-Fi®; wireless personal area network (WPANs), such as Bluetooth®; etc.

FIGS. 22-25 depict example interfaces of an app of the alert system 10. For example, the app is a mobile app configured to present the interfaces on a display of the mobile device 55.

Figure 22:
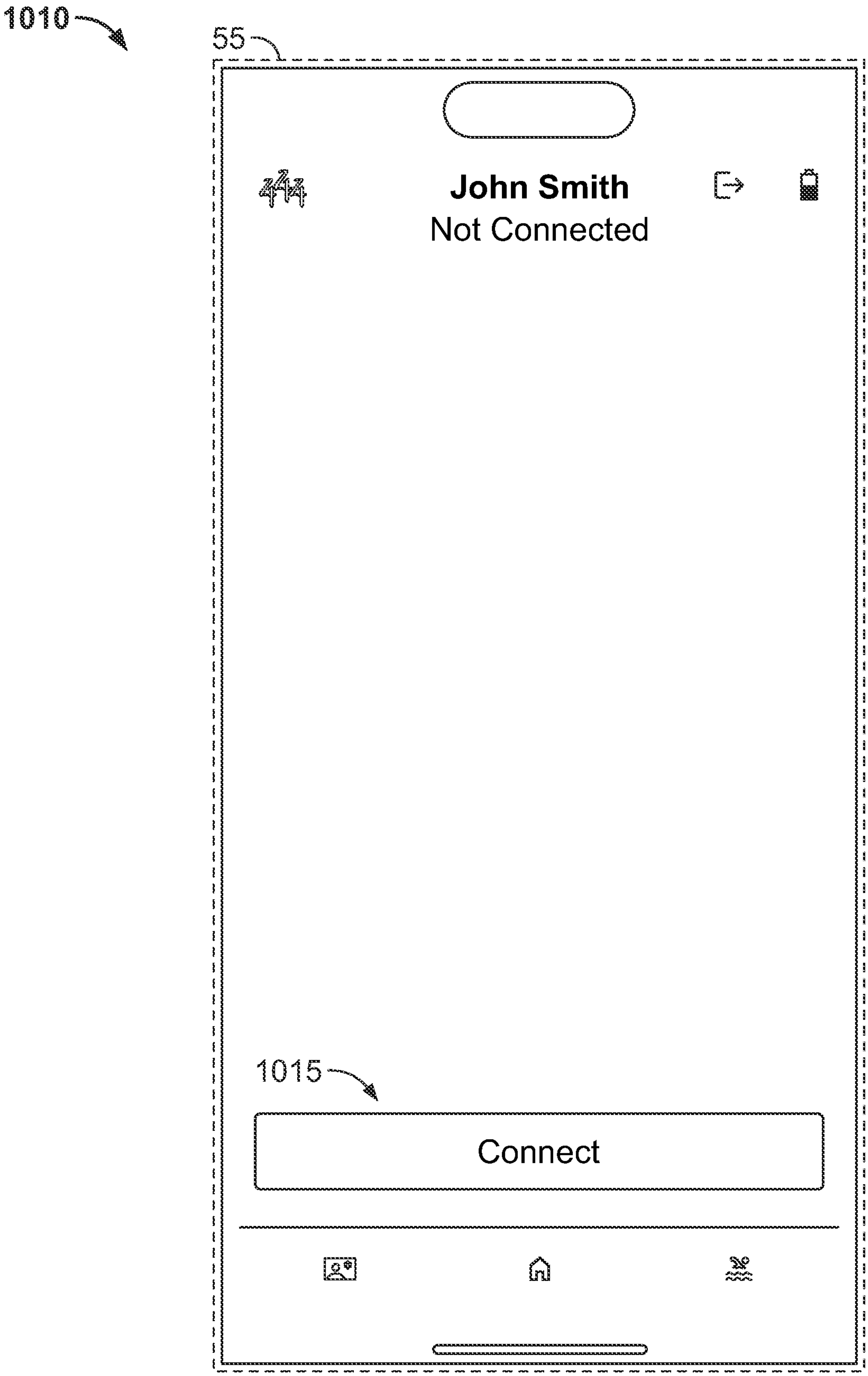
FIG. 22-25 depict example user interfaces of an app used within the environment of FIG. 20.

FIG. 22 illustrates an interface 1010 (also referred to as a "home interface") of the app that enables the mobile device 55 to communicatively connect to the self-defense device 40. The interface 1010 includes a button 1015 that is configured to enable the user 20 to communicatively connect the mobile device 55 and the self-defense device 40. For example, when the button 1015 is pressed by the user 20, the mobile device 55 is configured to "pair" with the self-defense device 40 via a WPAN connection, such as Bluetooth®.

Figure 23:
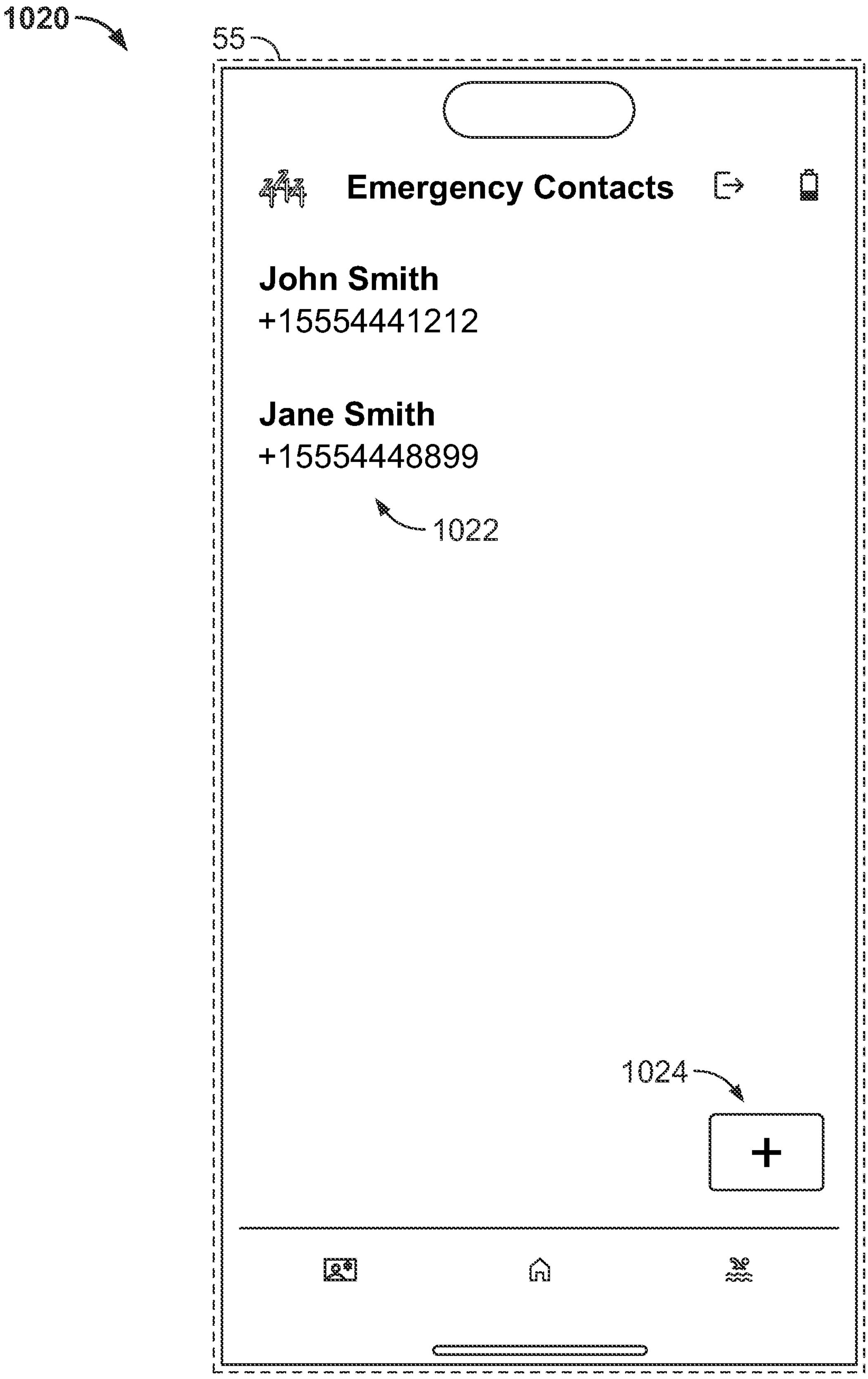

FIG. 23 illustrates another interface 1020 (also referred to as an "emergency contacts interface") of the app that enables the user 20 to preselect and view emergency contacts for the user 20. For example, the interface 1020 includes a list of preselected emergency contacts 1022. In some examples, the app is configured to enable the user 20 to select up to a predetermined number (e.g., 5, 10, etc.) of emergency contacts. The interface 1020 of the illustrated example also includes a button 1024 that is configured to enable the user 20 to add other contact(s) to the list of preselected emergency contacts 1022. For example, the app may pull a contacts list from the mobile device 55 and enable the user 20 to select which contact(s) from the contacts to add to the list of preselected emergency contacts 1022. In some examples, the mobile device 50 is configured to send contact information associated with the list of preselected emergency contacts 1022 (e.g., names, phone numbers, etc.) to the remote server 60, which stores the contact information in the contacts database 67.

Figure 24:
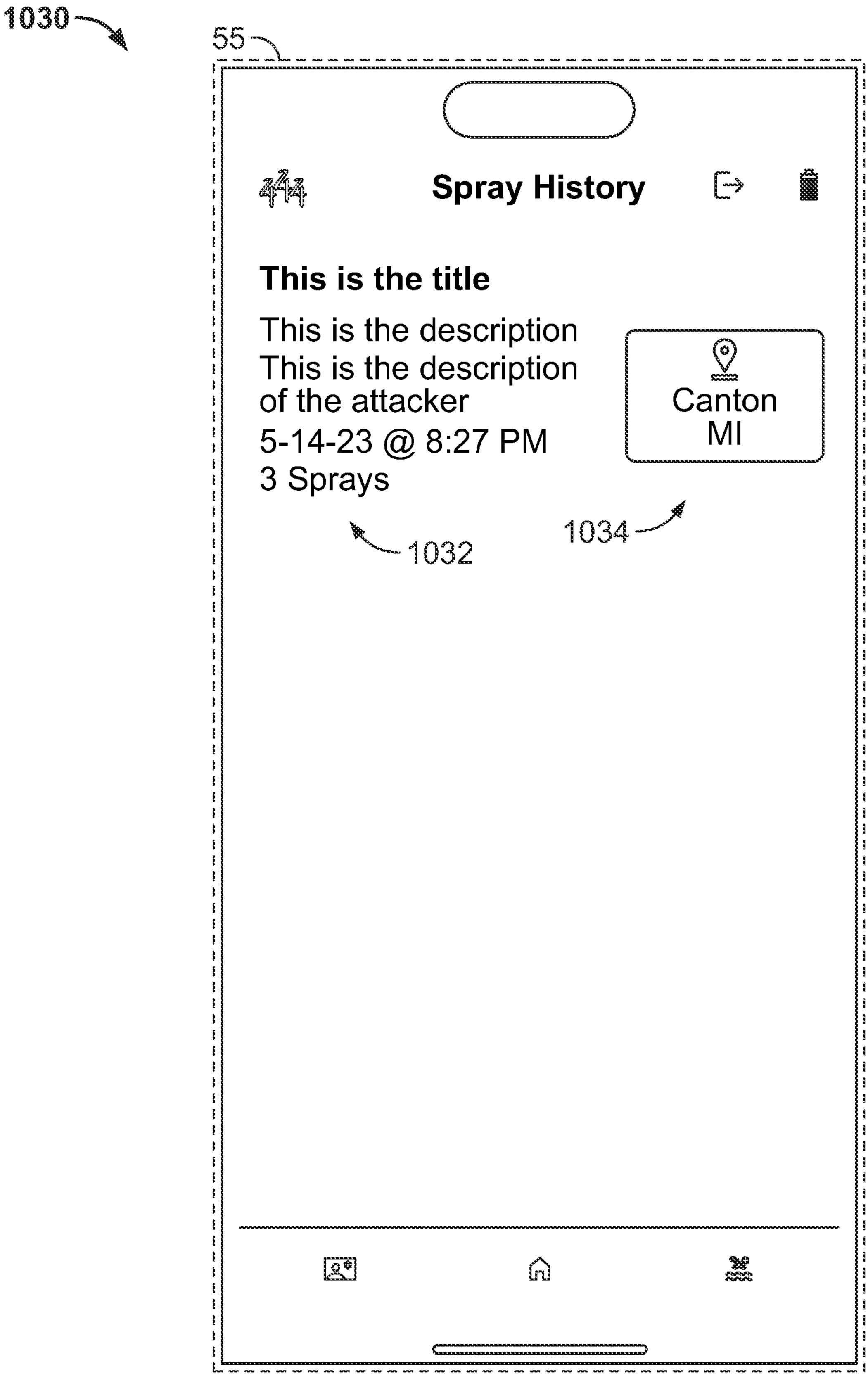

FIG. 24 illustrates an interface 1030 (also referred to as a "spray history interface") of the app that includes a historical list 1032 of when the spray nozzle (e.g., the spray nozzle 130) of the self-defense device 40 was used. For each historical event, the app is configured to record and save various information for each historical event in the historical list 1032. For example, the app is configured to record and save a description of the event, a description of the assailant, a time stamp of the event, the number of sprays, a location of the event, etc. The app is configured to automatically and in real-time record the time stamp of the event and/or the number of sprays based on communication of the self-defense device 40. Additionally or alternatively, the app is configured to obtain a current location at the event from a geolocation device (e.g., a GPS receiver) of the mobile device 50. The interface 1030 of the illustrated example includes a button 1034 for each event in the historical list 1032 to enable the user 20 to provide description of the event and/or the assailant. In some examples, the mobile device 50 is configured to send the information associated with each event in the historical list 1032 (e.g., description, time stamp, number of sprays, location, etc.) to the remote server 60, which stores the information in the events database 68.

Figure 25:
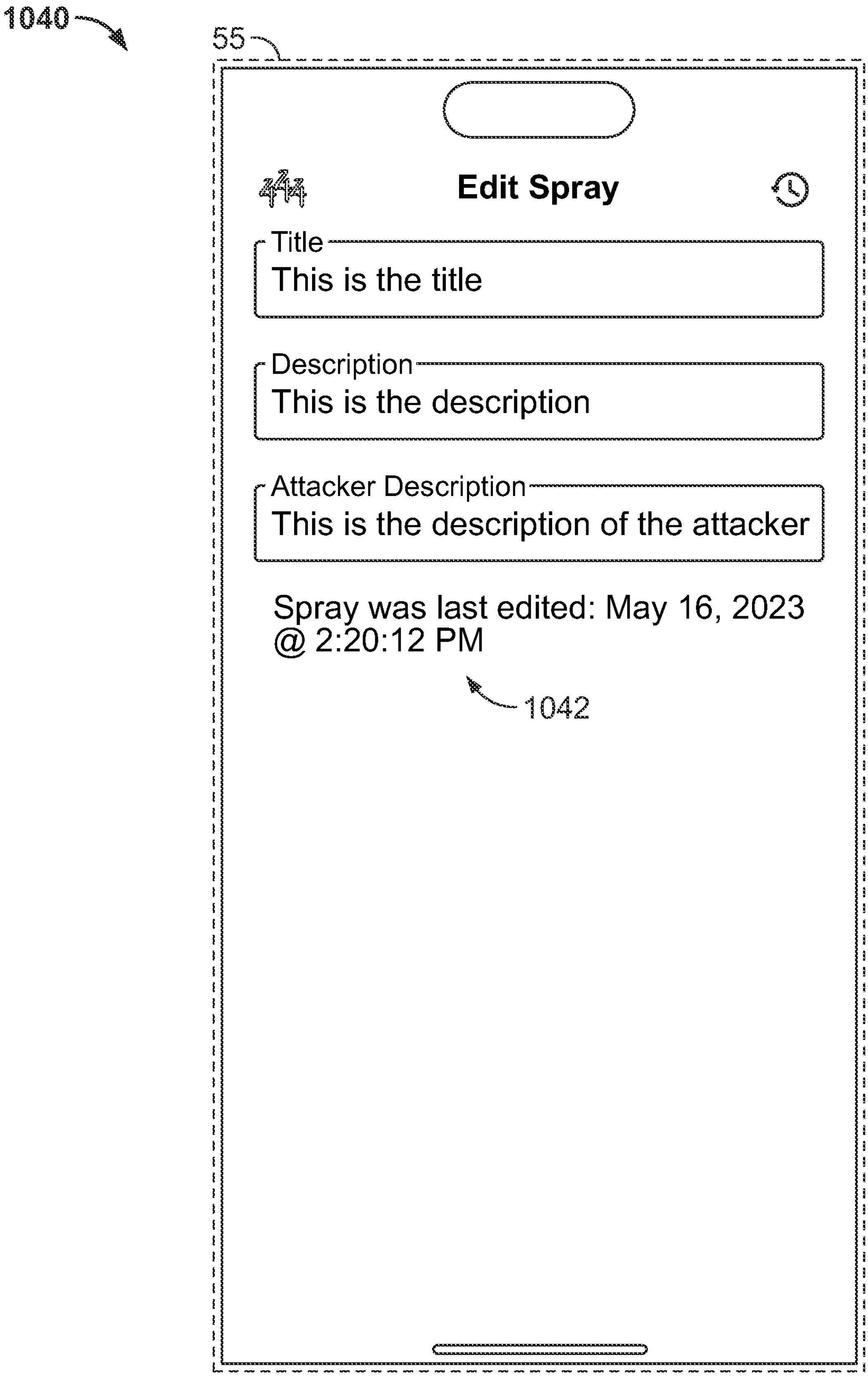

FIG. 25 illustrates another interface 1040 (also referred to as a "description interface") of the app that is configured to enable the user 20 to provide a brief description of an event. For example, the interface 1040 is presented in response to the user 20 selecting the button 1034 of the interface 1030. In the illustrated example, the interface 1040 includes one or more text boxes 1042 that enable the user 20 to provide a description of the corresponding event. For example, the interface 1040 includes a text box 1042 for a title of the event, another text box 1042 for a description of the event, and another text box 1042 for a description of the assailant. In other examples, the interface 1040 may include other types of input elements, such as a drop-down list, multiple-choice fields, etc.) that enable the user 20 to record an accurate description of the event.

Figure 26:
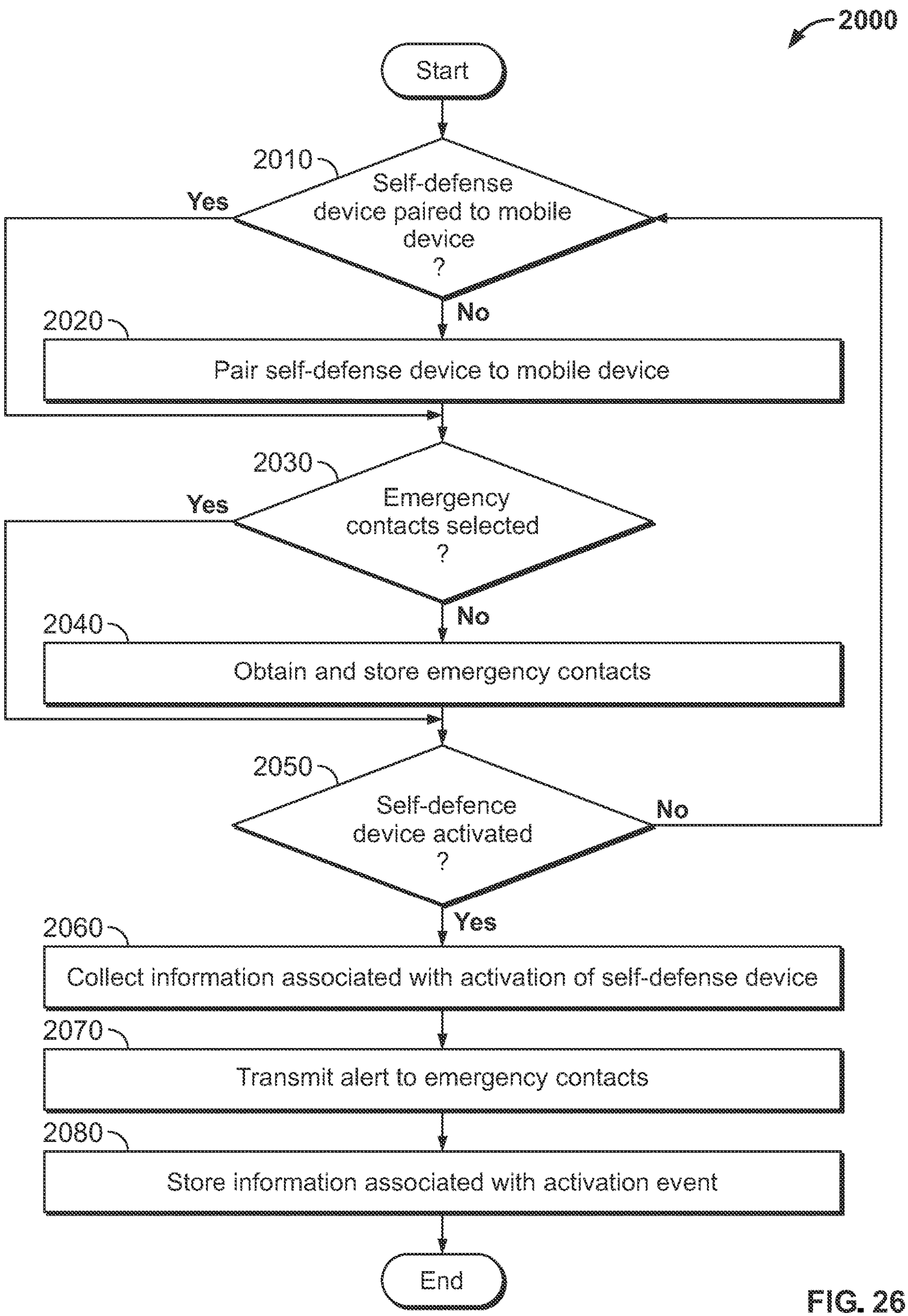
FIG. 26 is an example flowchart for using a self-defense device in accordance with the teachings herein.

FIG. 26 is a flowchart of an example method 2000 to use the self-defense device 40 (e.g., the self-defense device 100, the self-defense device 200, the self-defense device 300, etc.) within the alert system 10. The flowchart of FIG. 26 is representative of machine readable instructions that are stored in memory (e.g., the memory 166 of a self-defense device of FIG. 10, memory of the mobile device 50 of FIG. 20, the memory 64 of the remote server 60 of FIG. 21) and include one or more programs which, when executed by one or more processors (e.g., the processor(s) 164 of a self-defense device of FIG. 10, processor(s) of the mobile device 50 of FIG. 20, the processor(s) 62 of the remote server 60 of FIG. 21), cause the self-defense device 40, the mobile device 50, and/or the remote server 60 to operate within the alert system 10. While the example program is described with reference to the flowchart illustrated in FIG. 26, many other methods may alternatively be used. For example, the order of execution of the blocks may be rearranged, changed, eliminated, and/or combined to perform the method 2000. Further, because the method 2000 is disclosed in connection with the components of FIGS. 1-18, some functions of those components will not be described in detail below.

Initially, at block 2010, the mobile device 50 determines whether the mobile device is paired to the self-defense device 40. In response to the mobile device 50 determining that it is not paired to the self-defense device 40, the method 2000 proceeds to block 2020 at which the mobile device 50 is paired with the self-defense device 40. For example, the mobile device 55 is paired to the self-defense device 40 via a WPAN connection, such as Bluetooth®. In some examples, the user 20 uses the interface 1010 of a mobile app to pair the mobile device 50 to the self-defense device. The method 2000 proceeds to block 2030 (1) in response to the mobile device 50 determining at block 2010 that it is paired to the self-defense device 40 or (2) upon completion of block 2020.

At block 2030, the remote server 60 and/or the mobile device 50 determine whether the user 20 has selected emergency contacts. In response to the remote server 60 and/or the mobile device 50 determining that no emergency contacts have been selected, the method 2000 proceeds to block 2040 at which the mobile device 50 and/or the remote server 60 obtains a selection of one or more emergency contacts from the user 20. For example, the user 20 may use the interface 1020 of a mobile app to select the emergency contact(s). The selected emergency contacts may be stored in memory of the mobile device 50 and/or in the contacts database 67 of the remote server 60. The method 2000 proceeds to block 2050 (1) in response to the remote server 60 and/or the mobile device 50 determining at block 2030 that emergency contacts have been selected or (2) upon completion of block 2040.

At block 2050, the self-defense device 40, the mobile device 50, and/or the remote server 60 determines whether the self-defense device 40 has been activated. For example, the self-defense device 40 is activated when the user causes its spray nozzle (e.g., the spray nozzle) to spray the inflammatory agent. In response to the self-defense device 40, the mobile device 50, and/or the remote server 60 determining that the self-defense device 40 has not been activated, the method 2000 returns to block 2010. Otherwise, in response to the self-defense device 40, the mobile device 50, and/or the remote server 60 determining that the self-defense device 40 has been activated, the method 2000 proceeds to block 2060.

At block 2060, the mobile device 50 collects information associated with the activation event of the self-defense device 40. For example, the self-defense device 40 sends information to the mobile device 50 that is indicative of how many sprays occurred during the activation event. Upon receiving a signal from the self-defense device 40, the mobile device 50 records a timestamp (via a clock of the mobile device 50) and/or geolocation (via a GPS receiver of the mobile device 50) associated with the activation event. Additionally or alternatively, the mobile device 50 enables the user 20 to provide a description of the event and/or the assailant via the interface 1040 of a mobile app. Further, the mobile device 50 sends a signal to the remote server 60. The signal sent by the mobile device 50 may include the collected information. In other examples, at least some of the collected information (e.g., the user-provided description of the event and/or assailant) is sent by the mobile device 50 after the initial signal is sent to the remote server 60.

At block 2070, the mobile device 50 and/or the remote server 60 sends emergency alerts to the preselected emergency contacts. For example, upon receiving a signal from the mobile device 50 that indicates the user 20 was involved with an activation event, the remote server 60 retrieves the contact information of the emergency contact(s) of the user 20 from the contacts database 67. The remote server 60 then sends emergency alert(s) to those emergency contact(s) (e.g., via a text message, an email, a phone call, an app pop-up, etc.). At block 2080, the remote server 60 stores the collected information associated with the activation event in the events database 68 for subsequent review. Upon completion of block 2080, the method 2000 ends.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A compact self-defense device, comprising:

a housing defining a chamber configured to house a cartridge of an inflammatory agent and including a door configured to provide access to the cartridge housed in the chamber;

a spray nozzle including a button and at least partially housed in the housing, wherein the spray nozzle is configured to receive the cartridge in the housing, and wherein the spray nozzle is configured to spray the inflammatory agent when the button is engaged;

a sensor housed in the chamber and configured to detect when the spray nozzle is spraying the inflammatory agent; and a communication module housed in the chamber and configured to transmit a signal for alerting one or more preselected emergency contacts in response to the sensor detecting that the spray nozzle is spraying the inflammatory agent.

2. The compact self-defense device of claim 1, wherein the housing is formed of a plurality of shell bodies coupled together.

3. The compact self-defense device of claim 1, further comprising one or more rechargeable batteries configured to power the communication module.

4. The compact self-defense device of claim 3, further comprising a charging port for recharging the one or more rechargeable batteries.

5. The compact self-defense device of claim 1, further comprising one or more light emitting diodes (LEDs) configured to emit light to facilitate a user in locating and correctly orienting the compact self-defense device.

6. The compact self-defense device of claim 1, further comprising a clip attached to the housing and configured to securely fasten the compact self-defense device to a surface.

7. The compact self-defense device of claim 1, further comprising a keychain attached to the housing and configured to securely fasten the compact self-defense device to an object of a user.

8. The compact self-defense device of claim 1, wherein the door of the housing is a hinged door.

9. A self-defense system, comprising:

a self-defense device comprising:

a spray nozzle including a button and configured to receive a cartridge of an inflammatory agent, wherein the spray nozzle is configured to spray the inflammatory agent when the button is engaged;

a sensor configured to detect when the spray nozzle is spraying the inflammatory agent; and a communication module configured to transmit a signal to a mobile device in response to the sensor detecting that the spray nozzle is spraying the inflammatory agent; and a remote server configured to:

receive the signal of the self-defense system via the mobile device;

receive a description of an incident that is associated with a use of the self-defense device and was collected from a user via an app on the mobile device; and transmit an alert to one or more preselected emergency contacts in response to receiving the signal.

10. The self-defense system of claim 9, wherein the remote server is configured to transmit the alert to the one or more preselect emergency contact via at least one of a text message, a phone call, or an app pop-up.

11. The self-defense system of claim 9, wherein the remote server is configured to receive:

a timestamp from the mobile device that is indicative of when the mobile device received the signal from the self-defense device; and a geolocation of the mobile device that is indicative of where the mobile device was located when receiving the signal from the self-defense device.

12. The self-defense system of claim 9, wherein the remote server comprises an events database configured to store the timestamp, the geolocation, and the description of the incident associated with the use of the self-defense device for subsequent analysis to identify trends in reported incidences.

13. The self-defense system of claim 9, wherein the remote server comprises a contacts database configured to store contact information of the one or more preselected emergency contacts for a user associated with the self-defense device.

14. A compact self-defense device, comprising:

a housing defining a chamber configured to house a cartridge of an inflammatory agent;

a spray nozzle including a button and at least partially housed in the housing, wherein the spray nozzle is configured to receive the cartridge in the housing, and wherein the spray nozzle is configured to spray the inflammatory agent when the button is engaged;

a frame housed in the chamber and to which the spray nozzle and the cartridge are secured;

a sensor housed in the chamber and configured to detect when the spray nozzle is spraying the inflammatory agent; and a communication module housed in the chamber and configured to transmit a signal for alerting one or more preselected emergency contacts in response to the sensor detecting that the spray nozzle is spraying the inflammatory agent.

15. The compact self-defense device of claim 14, wherein the housing defines a hole and the spray nozzle includes an outlet that is adjacent to and aligns with the hole.

16. The compact self-defense device of claim 14, wherein the spray nozzle further includes a safety pin configured to prevent the button from being unintentionally engaged.

17. The compact self-defense device of claim 14, wherein the sensor includes a pressure sensor that is securely fixed to a portion of the spray nozzle to detect a change in pressure when the button of the spray nozzle is pressed.

18. The compact self-defense device of claim 14, wherein the communication module is configured to transmit the signal to a mobile device via a wireless personal area network (WPAN) connection.

19. The compact self-defense device of claim 14, further comprising a glass breaker positioned along an outer surface of the housing and configured to break through tempered glass.

20. The compact self-defense device of claim 19, wherein the glass breaker is secured to the frame.

* * * * *